US012771277B2

(12) United States Patent
Wada

(10) Patent No.: US 12,771,277 B2
(45) Date of Patent: Oct. 20, 2026

(54) MOTOR CONTROLLER, MOTOR CONTROL SYSTEM, AND MOTOR CONTROL METHOD

(71) Applicant: Mitsubishi Electric Corporation, Tokyo (JP)

(72) Inventor: Yasuhiko Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 296 days.

(21) Appl. No.: 18/687,935

(22) PCT Filed: Nov. 22, 2021

(86) PCT No.: PCT/JP2021/042728
§ 371 (c)(1),
(2) Date: Feb. 29, 2024

(87) PCT Pub. No.: WO2023/089805
PCT Pub. Date: May 25, 2023

(65) Prior Publication Data
US 2024/0388237 A1 Nov. 21, 2024

(51) Int. Cl.
*H02P 29/50* (2016.01)
*H02P 23/00* (2016.01)

(52) U.S. Cl.
CPC .......... *H02P 29/50* (2016.02); *H02P 23/0018* (2013.01)

(58) Field of Classification Search
CPC ........ H02M 1/32; H02M 7/5395; H02M 1/12; H02P 29/68; H02P 21/06; H02P 27/085; H02P 27/08; H02P 25/0221
See application file for complete search history.

(56) References Cited

U.S. PATENT DOCUMENTS

2012/0096881 A1 4/2012 Sakanobe et al.
2013/0119912 A1 5/2013 Ayano et al.
(Continued)

FOREIGN PATENT DOCUMENTS

JP 2004-092976 A 3/2004
JP 2012-010490 A 1/2012
(Continued)

OTHER PUBLICATIONS

Office Action dated Aug. 14, 2025 issued in corresponding European patent application No. 21964820.1.
(Continued)

*Primary Examiner* — Said Bouziane
(74) *Attorney, Agent, or Firm* — Posz Law Group, PLC

(57) ABSTRACT

A motor controller is provided with degradation estimation circuitry configured to calculate an estimated degradation level obtained by estimating a degradation level of a device on which a motor is mounted or a degradation level of an inverter; operation decision circuitry configured to compare the estimated degradation level and a reference degradation level, which is predetermined, and set an operation mode of the motor, in a case in which the estimated degradation level is lower than the reference degradation level, to an normal operation, and set the operation mode, in a case in which the estimated degradation level is higher than or equal to the reference degradation level, to a low-noise pulse operation; and control circuitry configured to control the inverter according to the operation mode. The low-noise pulse operation is designed to reduce switching loss to be less than does the normal operation.

17 Claims, 19 Drawing Sheets

(56) References Cited

U.S. PATENT DOCUMENTS

| | | | |
|---|---|---|---|
| 2017/0117841 A1 | 4/2017 | Watanabe et al. | |
| 2018/0226913 A1 | 8/2018 | Hatakeyama et al. | |
| 2019/0003928 A1* | 1/2019 | Unuma | H02P 29/0241 |
| 2020/0403548 A1 | 12/2020 | Hatakeyama et al. | |
| 2022/0374738 A1 | 11/2022 | Wada et al. | |

FOREIGN PATENT DOCUMENTS

| | | | | |
|---|---|---|---|---|
| JP | 2016-201962 A | 12/2016 | | |
| JP | 2020-188568 A | 11/2020 | | |
| JP | 2021-019423 A | 2/2021 | | |
| WO | 2017/037941 A1 | 3/2017 | | |
| WO | WO2020217879 | * | 10/2020 | |
| WO | WO-2020217879 A1 | * | 10/2020 | H02P 27/06 |
| WO | 2021/095142 A1 | 5/2021 | | |

OTHER PUBLICATIONS

Extended European Search Report dated Nov. 21, 2024 issued for the corresponding European Patent Application No. 21964820.1.

International Search Report of the International Searching Authority mailed Jan. 11, 2022 in corresponding International Patent Application No. PCT/JP2021/042728 (and English translation).

* cited by examiner

---- VOLTAGE COMMAND VALUE Vu_ref
—— OUTPUT VOLTAGE

---- VOLTAGE COMMAND VALUE Vu_ref
—— OUTPUT VOLTAGE

MOTOR CONTROLLER, MOTOR CONTROL SYSTEM, AND MOTOR CONTROL METHOD

CROSS REFERENCE TO RELATED APPLICATION

This application is a U.S. national stage application of PCT/JP2021/042728 filed on Nov. 22, 2021 the contents of which are incorporated herein by reference.

TECHNICAL FIELD

The present disclosure relates to a motor controller, a motor control system, and a motor control method that each control a motor.

BACKGROUND ART

A motor controller has been known that controls a motor that is driven by electric power supplied from a power source and converted by use of an electric-power converter device provided with an inverter. In a case in which a motor is mounted on a compressor, a failure in the compressor is caused by degradation, damage, or other unpleasant state of, for example, an inverter, a shaft bearing of the compressor, or the motor. Even in a case in which the compressor does not yet have a failure, when the compressor is still continuously driven in a state in which the inverter, the shaft bearing of the compressor, or the motor is in degradation or damage, the compressor eventually has a failure and thus causes downtime that a user does not predict. In Patent Literature 1, a failure diagnostic device has been disclosed that determines whether a compressor is in failure by operating the compressor when an air-conditioning apparatus is not in operation.

CITATION LIST

Patent Literature

Patent Literature 1: Japanese Unexamined Patent Application Publication No. 2004-92976

SUMMARY OF INVENTION

Technical Problem

The failure diagnostic device described in Patent Literature 1 is a device that determines whether a compressor is in failure when an air-conditioning apparatus is not in operation. In other words, the failure diagnostic device described in Patent Literature 1 is a device for a scheduled maintenance checkup on the compressor. Downtime unpredictable for a user however still usually requires unscheduled arrangement for repair or other time and effort. Downtime unpredictable for a user may thus require longer time than does predictable downtime such as a scheduled maintenance checkup. To increase an overall operation rate of a device on which a motor is mounted, a likelihood of downtime unpredictable for a user thus requires to be reduced or eliminated.

The present disclosure is made to solve such an above problem and to provide a motor controller, a motor control system, and a motor control method that each reduce or eliminate a likelihood of downtime unpredictable for a user in a device on which a motor is mounted.

Solution to Problem

A motor controller according to an embodiment of the present disclosure controls a motor that is driven by electric power supplied from a power source and converted by use of an electric-power converter device provided with an inverter. The motor controller is provided with degradation estimation circuitry configured to calculate an estimated degradation level obtained by estimating a degradation level of a device on which the motor is mounted or a degradation level of the inverter;

operation decision circuitry configured to compare the estimated degradation level and a reference degradation level, which is predetermined, and set an operation mode of the motor, in a case in which the estimated degradation level is lower than the reference degradation level, to an normal operation, and set the operation mode, in a case in which the estimated degradation level is higher than or equal to the reference degradation level, to a low-noise pulse operation; and control circuitry configured to control the inverter according to the operation mode. The low-noise pulse operation is designed to reduce switching loss to be less than does the normal operation.

Advantageous Effects of Invention

The motor controller according to an embodiment of the present disclosure performs the low-noise pulse operation designed to reduce switching loss to be less than does the normal operation. Progress in degradation of the inverter and the motor is thus made delayed. With a device on which the motor is mounted, a likelihood of downtime unpredictable for a user is thus reduced or eliminated until time elapses to a scheduled maintenance checkup.

DESCRIPTION OF EMBODIMENTS

Figure 1:
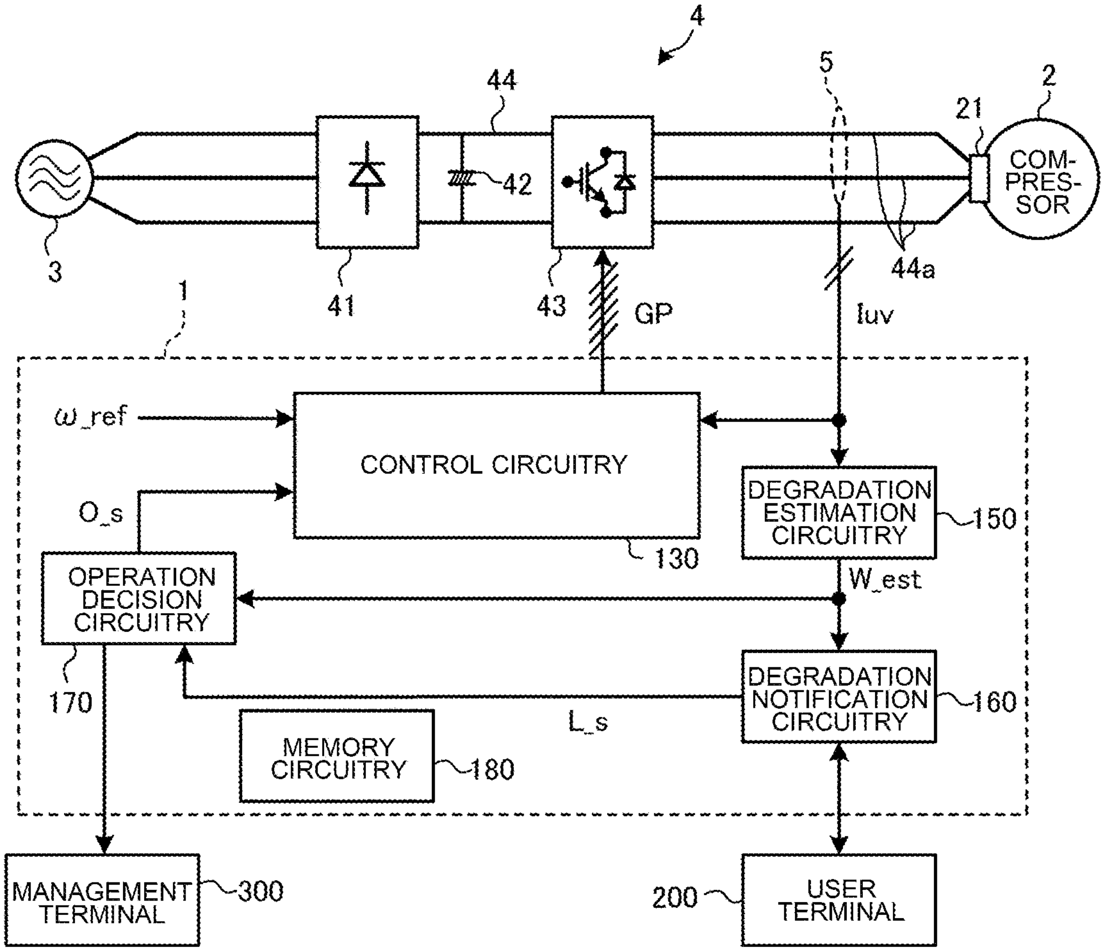
FIG. 1 is a schematic configuration diagram that illustrates a compressor, a power source, and an electric-power converter device according to Embodiment 1.

A method of controlling a motor controller 1, a motor control system 1A, a compressor 2, and a motor 21 is described below with reference to drawings. In the drawings, components denoted by the same reference signs are the same components or equivalents. These reference signs are common through all embodiments described below. The form of a component represented in all embodiments is merely an example and the component is not limited to the form described below. In particular, combinations of the components are not intended to be limited only to combinations in the embodiments. A component described in one embodiment is applicable to another embodiment. In addition, a level of a parameter such as a pressure and a temperature is not determined in relation to a particular absolute value but is relatively determined under conditions, such as states and behavior of devices or other components.

Embodiment 1

FIG. 1 is a schematic configuration diagram that illustrates the compressor 2, a power source 3, and an electric-power converter device 4 according to Embodiment 1. As illustrated in FIG. 1, the compressor 2 has the motor 21 and the motor controller 1 that controls the motor 21. The motor 21 rotates by use of electric power supplied from the power source 3 and converted by the electric-power converter device 4, and the compressor 2 thus compresses a fluid such as refrigerant used by a refrigeration cycle apparatus such as an air-conditioning apparatus. A case is described below as an example in which the motor 21 is mounted on the compressor 2 and the compressor 2 is applied in an air-conditioning apparatus. In addition, the motor 21 may also be mounted on other device and the compressor 2 may also be applied in other apparatus. The power source 3 is a commercially available three-phase alternating-current power source, which has, for example, a U-phase, a V-phase, and a W-phase. The motor 21 is a three-phase permanent-magnet synchronous motor, which has, for example, a U-phase, a V-phase, and a W-phase. To the electric-power converter device 4, the power source 3 and the motor 21, which is a load, are connected.

The electric-power converter device 4 has a rectifier circuit 41, an electrolytic capacitor 42, and an inverter 43. The power source 3, the rectifier circuit 41, the electrolytic capacitor 42, the inverter 43, and the motor 21 are connected to each other by wires 44. The rectifier circuit 41 converts three-phase alternating-current electric power from the power source 3 into direct-current electric power. The electrolytic capacitor 42 smooths the direct-current electric power from the rectifier circuit 41. The inverter 43 converts the direct-current electric power from the rectifier circuit 41 into three-phase alternating-current electric power and outputs the three-phase alternating-current electric power to the compressor 2.

To the electric-power converter device 4, a current sensor 5 is provided. The current sensor 5 is provided to wires **44*a*. The wires 44*a* are portions of the wires 44 located on the way from the inverter 43 to the motor 21. The current sensor 5 detects a two-phase electric current among a three-phase alternating electric current that flows from the inverter 43 to the compressor 2. At the current sensor 5, an electric current Iu, which flows through the U-phase, and electric current Iv, which flows through the V-phase, are detected. In addition, a U-phase electric current Iu and a V-phase electric current Iv are also collectively referred to as an electric current Iuv in some cases below. The current sensor 5 sends the detected electric current Iuv to the motor controller 1**.

The motor controller 1 executes a method of controlling the motor 21 by adjusting a switching pattern included in a gate pulse GP output to the inverter 43. The switching patterns are a set of switching states each in response to a single cycle of a voltage command value. The voltage command value is a signal through which an output voltage of the inverter 43 is ordered. The motor controller 1 generates a gate pulse GP for each cycle of voltage command values.

The motor controller 1 is dedicated hardware or a set of memory circuitry 180 and a central processing unit (CPU) that executes a program stored in the memory circuitry 180. In a case in which the motor controller 1 is dedicated hardware, the motor controller 1 is a circuit such as an application specific integrated circuit (ASIC) and a field-programmable gate array (FPGA).

In a case in which the motor controller 1 is a set of the memory circuitry 180 and a CPU, functions of the motor controller 1 are implemented by software, firmware, or a combination of software and firmware. Software and firmware are described as programs and stored in the memory circuitry 180. The memory circuitry 180 is, for example, a volatile or non-volatile semiconductor memory such as a RAM, a ROM, a flash memory, an EPROM, and an EEPROM.

The motor controller 1 has control circuitry 130, degradation estimation circuitry 150, degradation notification circuitry 160, and operation decision circuitry 170. The control circuitry 130, the degradation estimation circuitry 150, the degradation notification circuitry 160, and the operation decision circuitry 170 are described later. In addition, the motor controller 1 only requires to have at least the control circuitry 130, and the degradation estimation circuitry 150, the degradation notification circuitry 160, and the operation decision circuitry 170 may also be mounted on other components such as hardware.

Inverter 43

Figure 2:
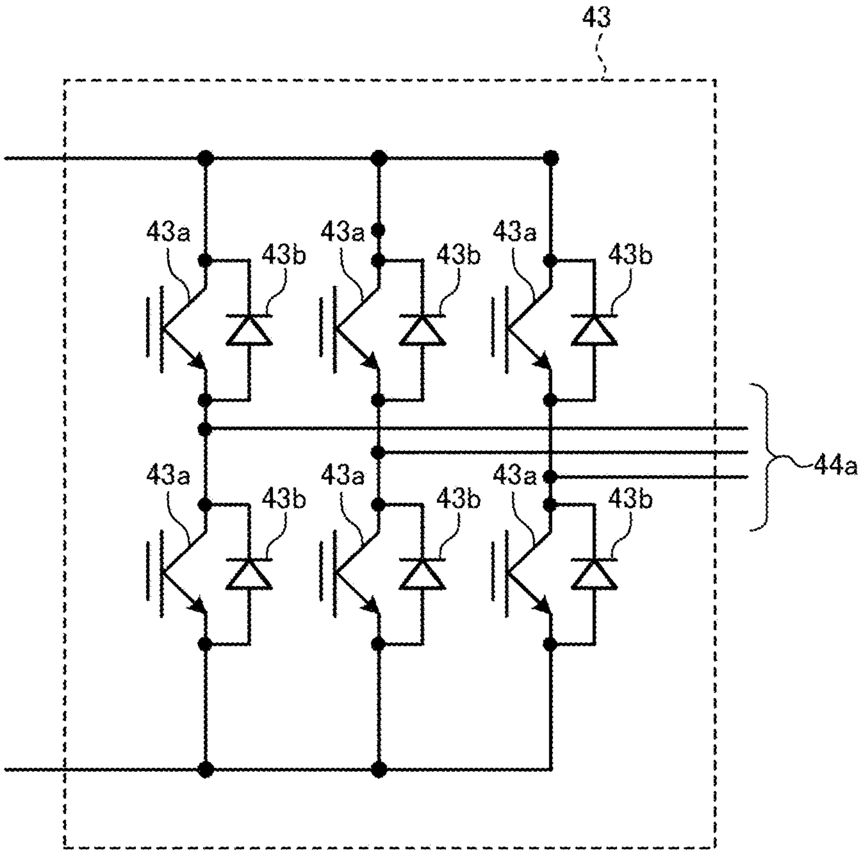
FIG. 2 is a circuit diagram that illustrates an inverter according to Embodiment 1.

FIG. 2 is a circuit diagram that illustrates the inverter 43 according to Embodiment 1. As illustrated in FIG. 2, the inverter 43 has six switching elements 43*a*, which are up-down pairs that correspond to respective phases, and six backflow-prevention elements 43*b*, which are parallel to the respective switching elements 43*a*. The inverter 43 supplies, to the motor 21 of the compressor 2, electric power obtained by converting a direct-current voltage into a three-phase alternating-current voltage according to a gate pulse GP generated from the control circuitry 130.

The switching element 43*a* and the backflow-prevention element 43*b* may also have a substrate made from a wide-band-gap semiconductor as typified by material such as silicon carbide (SIC), gallium nitride (GaN) system, and a diamond. The switching element 43*a* and the backflow-prevention element 43*b* each provided with a wide-band-gap semiconductor are high in both voltage endurance and allowable electric current, and the elements are thus downsizable. By use of the downsized switching elements 43*a* and the downsized backflow-prevention elements 43*b*, a semiconductor module in which these elements are built is thus downsizable.

The switching element 43*a* and the backflow-prevention element 43*b* each provided with a wide-band-gap semiconductor are also high in heat resistance, and an unillustrated cooling mechanism required to reject heat of the inverter 43 is thus downsizable. The cooling mechanism is, for example, radiating fins, a water-cooling mechanism, or an air-cooling mechanism. In addition, by use of, for example, an air-cooling system with a simple structure as the cooling mechanism, such a cooling system is simplified and a semiconductor module in which the switching elements 43*a* and the backflow-prevention elements 43*b* are built is further downsizable.

The switching element 43*a* and the backflow-prevention element 43*b* each provided with a wide-band-gap semiconductor are also low in electric power loss and thus improves power conversion efficiency. The compressor 2 is thus driven at high conversion efficiency.

In addition, both the switching element 43*a* and the backflow-prevention element 43*b* preferably each have a wide-band-gap semiconductor. Alternatively, any one of the elements may also have a wide-band-gap semiconductor. In the first place, both the elements may also be each formed by a material other than a wide-band-gap semiconductor. As a material other than a wide-band-gap semiconductor, silicon (Si), which is also widely used, is adopted.

In a state in which the switching element 43*a* in the inverter 43 is degraded, electric power supplied from the inverter 43 to the motor 21 is unstable. In a state in which the switching element 43*a* in the inverter 43 is degraded, when the compressor 2 is continuously driven, the rotation of the motor 21 is thus unstable and the compressor 2 may be in failure. Degradation of the switching element 43*a* in the inverter 43 is thus a factor that may cause downtime unpredictable for a user.

Compressor 2

Figure 3:
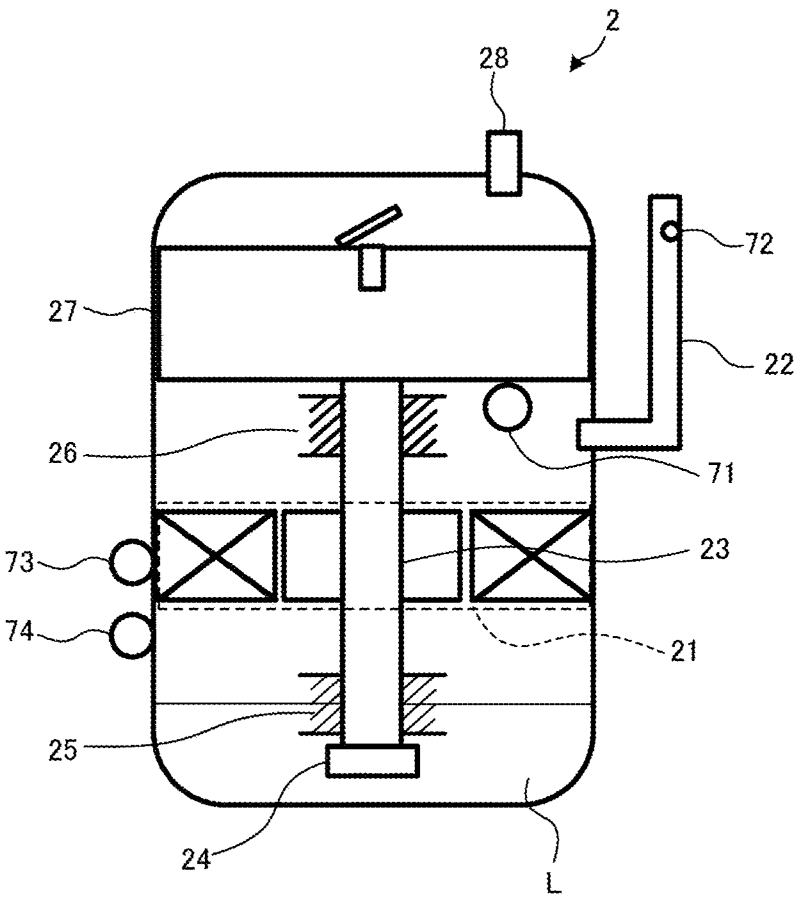
FIG. 3 is a schematic configuration diagram that illustrates the compressor according to Embodiment 1.

FIG. 3 is a schematic configuration diagram that illustrates the compressor 2 according to Embodiment 1. FIG. 3 illustrates a cross-sectional view of the compressor 2 cut in an up-down direction. As illustrated in FIG. 3, the compressor 2 has the motor 21, a suction pipe 22, a main shaft 23, an oil pump 24, a sub-shaft bearing 25, a main shaft bearing 26, a compression mechanism 27, and a discharge pipe 28. The compressor 2 is connected to, for example, an unillustrated condenser, an unillustrated expansion valve, an unillustrated evaporator by unillustrated refrigerant pipes.

The motor 21 is connected to the three-phase alternating-current wires 44*a*, which are referable to FIG. 1, and is driven according to a voltage applied by the inverter 43. In a state in which the motor 21 is degraded, the rotation of the motor 21 is unstable and the compressor 2 may thus be in failure. Degradation of the motor 21 is thus a factor that may cause downtime unpredictable for a user.

The suction pipe 22 is a pipe through which low-temperature and low-pressure refrigerant is sucked in the compressor 2. The main shaft 23 is connected to the motor 21 and, via the main shaft 23, rotational energy is transferred to the compression mechanism 27. The oil pump 24 supplies lubricating oil L stored in the bottom of the compressor 2 to the main shaft 23 and the sub-shaft bearing 25 and the lubricating oil L lubricates the main shaft 23 and the sub-shaft bearing 25. In addition, as a means to confirm the amount of the lubricating oil L, a fluid-level sensor configured to detect the oil level of the lubricating oil L may also be attached to measure the amount of the lubricating oil L.

The sub-shaft bearing 25 supports a lower portion of the main shaft 23 such that the main shaft 23 is rotatable. The main shaft bearing 26 supports an upper portion of the main shaft 23 such that the main shaft 23 is rotatable. The compression mechanism 27 compresses refrigerant supplied from the suction pipe 22 and sends out the refrigerant to the discharge pipe 28. The discharge pipe 28 is a pipe through which high-temperature and high-pressure refrigerant compressed by the compression mechanism 27 is discharged out from the compressor 2.

The compressor 2 has a pressure sensor 71, a flow-rate sensor 72, a temperature sensor 73, and a humidity sensor 74. The pressure sensor 71 is attached inside the compressor 2 and measures the pressure of refrigerant inside the compressor 2. The flow-rate sensor 72 is attached to the suction pipe 22 and measures the flow rate of refrigerant that flows inside the pipe. The temperature sensor 73 is attached outside the housing of the compressor 2 and measures the temperature around the compressor 2. The humidity sensor 74 is attached outside the housing of the compressor 2 and measures the humidity around the compressor 2. In addition, to the suction pipe 22 or the discharge pipe 28, a sensor configured to measure the pressure, the temperature, or the humidity of refrigerant that flows inside the pipe may also be attached. Measurement information that indicates physical quantity such as a refrigerant pressure measured by the pressure sensor 71, a refrigerant flow rate measured by the flow-rate sensor 72, an ambient temperature measured by the temperature sensor 73, and an ambient humidity measured by the humidity sensor 74 is sent to unillustrated components such as a controller of an air-conditioning apparatus and is used for control of devices of the air-conditioning apparatus.

Figure 4:
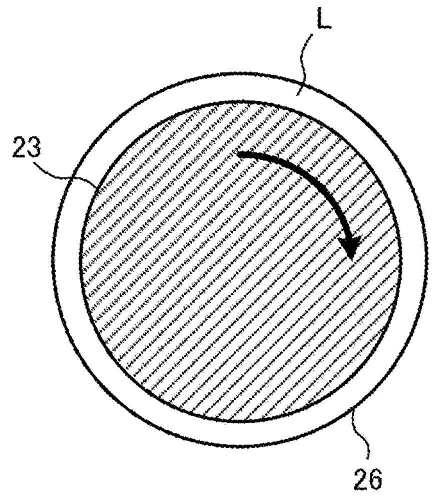
FIG. 4 is a diagram used to describe a positional relationship between a main shaft and a main shaft bearing according to Embodiment 1.
Figure 5:
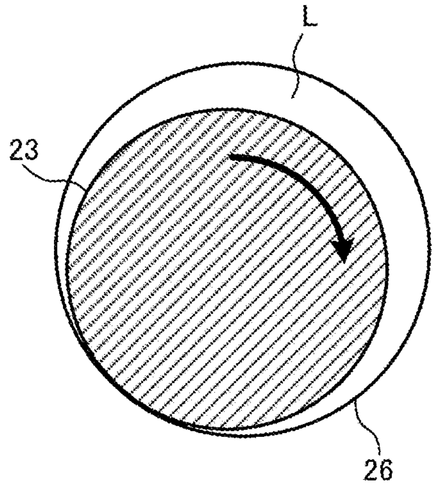
FIG. 5 is a diagram used to describe a positional relationship between the main shaft and the main shaft bearing according to Embodiment 1.

A positional relationship between the main shaft 23 and the main shaft bearing 26 in a case in which the compressor 2 is driven is described with reference to FIG. 4 and FIG. 5. FIG. 4 and FIG. 5 are diagrams used to describe a positional relationship between the main shaft 23 and the main shaft bearing 26 according to Embodiment 1. FIG. 4 illustrates a cross-sectional view of the main shaft 23 and the main shaft bearing 26 in a case in which the compressor 2 is cut in a direction perpendicular to the center axis of the main shaft 23. FIG. 4 illustrates a cross-sectional view in a case in which the main shaft 23 and the main shaft bearing 26 are kept lubricated and the compressor 2 is normally driven. FIG. 5 illustrates a cross-sectional view in a case in which the main shaft 23 and the main shaft bearing 26 are not kept lubricated and the compressor 2 is abnormally driven.

As illustrated in FIG. 4, when the compressor 2 is normally driven, sufficient lubricating oil L is filled in between the main shaft 23 and the main shaft bearing 26 and the main shaft 23 is spaced away from the main shaft bearing 26 with a constant gap ensured and smoothly rotates. On the other hand, as illustrated in FIG. 5, when the compressor 2 is abnormally driven, a portion of the main shaft 23 and a portion of the main shaft bearing 26 are in contact with each other. This is because an effect such as temperature and aging degradation lowers the viscosity of the lubricating oil L and oil film between the main shaft 23 and the main shaft bearing 26 is thus not ensured. At a location at which a portion of the main shaft 23 and a portion of the main shaft bearing 26 are in contact with each other, the portion of the main shaft bearing 26 is worn down. When the main shaft 23 is kept rotated in a state in which a portion of the main shaft bearing 26 is worn down, the main shaft bearing 26 is further worn down and the compressor 2 cannot eventually be operated. As described above, abrasion of the main shaft bearing 26 is thus a factor that may cause downtime unpredictable for a user.

Control Circuitry 130

With reference back to FIG. 1, the control circuitry 130 in the motor controller 1 is described. The control circuitry 130 outputs a gate pulse GP to the inverter 43 on the basis of the electric current Iuv, a speed command value ω_ref, and an operation-mode switching signal O_s. The electric current Iuv is electric current that flows in the wires 44*a* and is detected by the current sensor 5. The speed command value ω_ref is a command value for a rotational speed of the motor 21 according to a load state of the compressor 2. The speed command value ω_ref is comprehensively acquirable on the basis of an operational state of the compressor 2 in an air-conditioning apparatus, an operational instruction from a user, and other factor. The operation-mode switching signal O_s is a signal received from the operation decision circuitry 170. The signal indicates either one of "ON" and "OFF" and thus indicates a type of operation modes of the motor 21.

The operation modes of the motor 21 are the normal operation and the low-noise pulse operation. "OFF" of the operation-mode switching signal O_s indicates the normal operation and "ON" of the operation-mode switching signal O_s indicates the low-noise pulse operation. The normal operation is an operation in which non-synchronous PWM control is exercised. The non-synchronous PWM control does not synchronize a frequency of a carrier signal and a frequency of an output voltage of the inverter 43 with each other. The low-noise pulse operation is an operation in which synchronous PWM control is exercised. The synchronous PWM control causes a frequency of a carrier signal in PWM control to be equal to an integral multiple of a frequency of an output voltage of the inverter 43. In addition, a frequency of a carrier signal in PWM control is simply referred to as "carrier frequency" in some cases below. As described above, the control circuitry 130 causes the motor 21 to perform either one of the normal operation and the low-noise pulse operation according to an operation mode set by the operation decision circuitry 170. In addition, a process is described later in which the operation decision circuitry 170 decides and sets the operation-mode switching signal O_s to either one of "ON" and "OFF".

Figure 6:
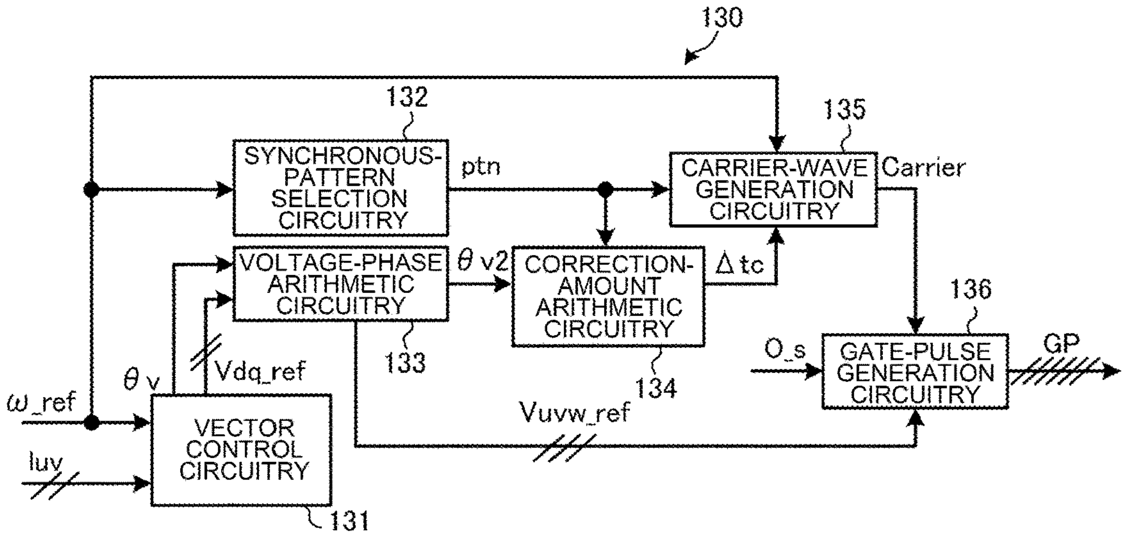
FIG. 6 is a functional block diagram that illustrates control circuitry according to Embodiment 1.

With reference to FIG. 6, the control circuitry 130 is described in detail. FIG. 6 is a functional block diagram that illustrates the control circuitry 130 according to Embodiment 1. The control circuitry 130 has vector control circuitry 131, synchronous-pattern selection circuitry 132, voltage-phase arithmetic circuitry 133, correction-amount arithmetic circuitry 134, carrier-wave generation circuitry 135, and gate-pulse generation circuitry 136.

The vector control circuitry 131 exercises vector control, which is a known technique, according to the speed command value ω_ref and a two-phase electric current Iuv among a three-phase alternating electric current and outputs, to the voltage-phase arithmetic circuitry 133, a dq-axis voltage command value Vdq_ref and a reference voltage phase θv subjected to control delay correction. In addition, the control delay correction is processing in which timing of the speed command value and timing of a feedback detection value are adjusted and usually provides the value θv obtained by multiplying a value obtained by integrating the speed command value ω_ref with 1.5 in consideration of dead time.

The synchronous-pattern selection circuitry 132 generates a carrier mode ptn according to the speed command value ω_ref and sends the carrier mode ptn to the correction-amount arithmetic circuitry 134 and the carrier-wave generation circuitry 135. The carrier mode ptn indicates patterns of PWM control, which is related to motor control. Specifically, the carrier mode ptn has two patterns different in carrier frequency generated by the carrier-wave generation circuitry 135. In other words, one of the two patterns is for an operation mode in which the non-synchronous PWM control is exercised and the other one is for an operation mode in which the synchronous PWM control is exercised.

The first pattern in the carrier mode ptn indicates the non-synchronous PWM control in which a carrier frequency is set irrespective of a frequency of an output voltage of the inverter 43. As described above, the normal operation uses the non-synchronous PWM control, and the first pattern in the carrier mode ptn is thus generated when the motor 21 is caused to perform the normal operation.

The second pattern in the carrier mode ptn indicates the synchronous PWM control in which a carrier frequency is set to be equal to an integral multiple of a frequency of an output voltage of the inverter 43. As described above, the low-noise pulse operation uses the synchronous PWM control, and the second pattern in the carrier mode ptn is thus generated when the motor 21 is caused to perform the low-noise pulse operation. In addition, as the synchronous PWM control, a synchronous 9 pulse mode in which a carrier frequency is set to be nine times larger than a frequency of an output voltage of the inverter 43 and a synchronous 3 pulse mode in which a carrier frequency is set to be three times larger than a frequency of an output voltage of the inverter 43 are used. The synchronous 9 pulse mode is simply referred to as "synchronous 9 pulse" and the synchronous 3 pulse mode is simply referred to as "synchronous 3 pulse" in some cases below.

Figure 7:
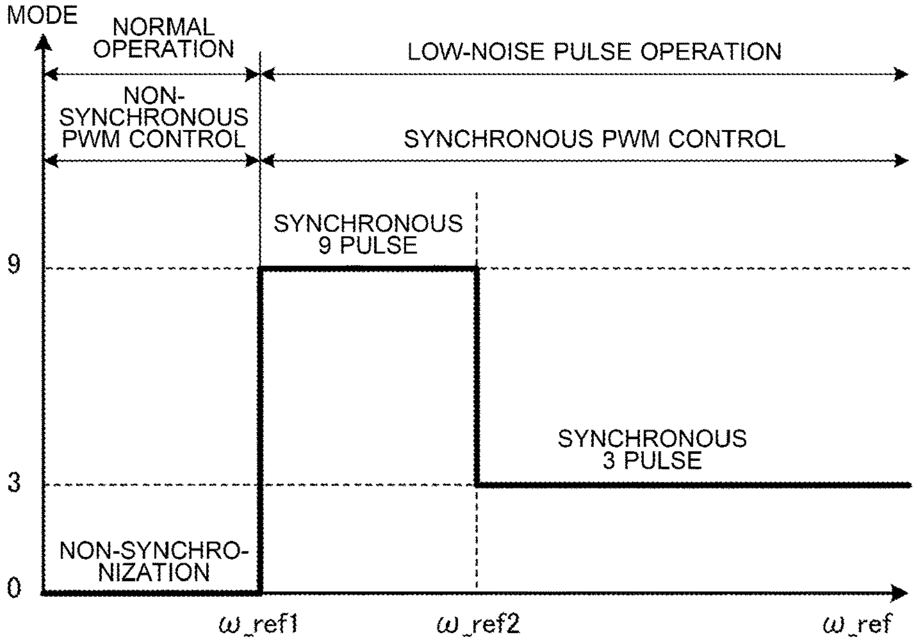
FIG. 7 is a diagram used to describe a method of generating a carrier mode according to Embodiment 1.

FIG. 7 is a diagram used to describe a method of generating the carrier mode ptn. The method of generating the carrier mode ptn by the synchronous-pattern selection circuitry 132 is described with reference to FIG. 7. As illustrated in FIG. 7, the synchronous-pattern selection circuitry 132 compares a speed at which the motor 21 is driven, that is, the speed command value ω_ref, and the corresponding one of a switching speed ω_ref1 [rps] and a switching speed ω_ref2 [rps] with each other and thus determines the carrier mode ptn. The switching speeds ω_ref1 [rps] and ω_ref2

[rps] are preset threshold values. The synchronous-pattern selection circuitry 132 generates a carrier mode ptn that corresponds to a synchronization mode in a range higher than or equal to the switching speed ω_ref1. The synchronous-pattern selection circuitry 132 also generates a carrier mode ptn such that, as the speed command value ω_ref increases, a frequency ratio between a carrier signal and an output voltage of the inverter 43 sequentially and gradually reduces.

The synchronous-pattern selection circuitry 132 specifically generates a carrier mode ptn as follows. The synchronous-pattern selection circuitry 132 generates, as a carrier mode ptn, 0, which indicates a non-synchronization mode, in a case in which the speed command value ω_ref is higher than or equal to 0 [rps] and lower than ω_ref1 [rps]. The synchronous-pattern selection circuitry 132 generates, as a carrier mode ptn, 9, which indicates a synchronous 9 pulse in the synchronization mode, in a case in which the speed command value ω_ref is higher than or equal to ω_ref1 [rps] and lower than ω_ref2 [rps]. The synchronous-pattern selection circuitry 132 generates, as a carrier mode ptn, 3, which indicates a synchronous 3 pulse in the synchronization mode, in a case in which the speed command value ω_ref is higher than or equal to ω_ref2 [rps]. The carrier mode ptn is thus 0 during the non-synchronization mode and is thus either one value of 3 and 9 during the synchronization mode. The synchronous-pattern selection circuitry 132 sends a carrier mode ptn to the correction-amount arithmetic circuitry 134 and the carrier-wave generation circuitry 135 every time the carrier mode ptn is switched.

The voltage-phase arithmetic circuitry 133 calculates a voltage phase θv2 subjected to phase adjustment by use of the dq-axis voltage command value Vdq_ref and the reference voltage phase θv received from the vector control circuitry 131. The voltage phase θv2 is defined by, for example, a phase to which a 90 [deg] phase is shifted from the reference voltage phase θv. The voltage-phase arithmetic circuitry 133 sends the voltage phase θv2 to the correction-amount arithmetic circuitry 134.

The voltage-phase arithmetic circuitry 133 also converts the dq-axis voltage command value Vdq_ref into a three-phase coordinate system by use of the voltage phase θv2 and thus arithmetically determines a three-phase voltage command value Vuvw_ref. The voltage-phase arithmetic circuitry 133 sends the three-phase voltage command value Vuvw_ref to the gate-pulse generation circuitry 136.

The correction-amount arithmetic circuitry 134 arithmetically determines a carrier-cycle correction amount Δtc on the basis of the voltage phase θv2 received from the voltage-phase arithmetic circuitry 133 and the carrier mode ptn received from the synchronous-pattern selection circuitry 132. The carrier-cycle correction amount Δtc is to be used to correct a difference between the voltage phase θv2 and a phase command value θv2_ref, which corresponds to the carrier mode ptn. The correction-amount arithmetic circuitry 134 sends the carrier-cycle correction amount Δtc, which is arithmetically determined, to the carrier-wave generation circuitry 135.

An arithmetic operation of the carrier-cycle correction amount Δtc is specifically described. The correction-amount arithmetic circuitry 134 generates a phase command value θv2_ref for every synchronization pulse and thus generates a carrier wave. In other words, the correction-amount arithmetic circuitry 134 generates, every time the carrier mode ptn is switched, a phase command value θv2_ref that corresponds to the switched carrier mode ptn. In a case in which, for example, control is exercised in the synchronous 9 pulse, a voltage phase θv2 is preset for every 40=360/9 [deg] in response to a single cycle of a carrier wave. Such an arithmetic operation ensures continuity while a carrier mode is being switched.

In such an arithmetic operation, a difference may arise between a phase command θv2_ref and the voltage phase θv2. The correction-amount arithmetic circuitry 134 performs processing described below to promptly eliminate the difference. By use of, for example, an equation (1) described below, a phase difference value ΔP, which corresponds to the difference between the phase command θv2_ref and the voltage phase θv2, is first calculated.

$$\Delta P = \theta v2\_\mathrm{ref} - \theta v2 \tag{1}$$

The correction-amount arithmetic circuitry 134 next calculates a carrier-cycle correction amount Δtc by use of, for example, an equation (2) described below. In the equation (2), GAIN is a carrier-cycle gain. The correction-amount arithmetic circuitry 134 multiplies the phase difference value by GAIN and thus converts the phase difference value into a cycle difference amount. In addition, as long as the phase difference value ΔP falls within the entire operation areas, a fixed value or a variable value may also be set as the carrier-cycle gain GAIN. In a case in which, for example, the carrier-cycle gain GAIN is set to a variable value, the carrier-cycle gain GAIN may also be set such as the carrier-cycle gain GAIN is adjusted according to the speed command value ω_ref. The correction-amount arithmetic circuitry 134 sends the carrier-cycle correction amount Δtc to the carrier-wave generation circuitry 135 as well.

$$\Delta tc = \Delta P \times \mathrm{GAIN} \tag{2}$$

Figure 8:
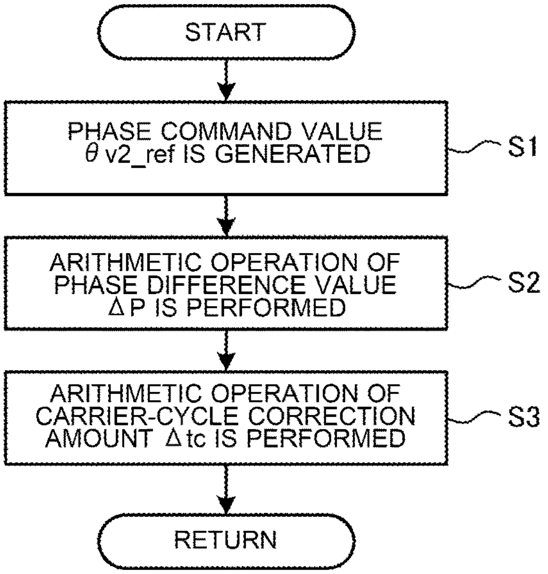
FIG. 8 is a flowchart that illustrates behavior of correction-amount arithmetic circuitry according to Embodiment 1.

A method by which the correction-amount arithmetic circuitry 134 generates the carrier-cycle correction amount Δtc is described below with reference to FIG. 8. FIG. 8 is a flowchart that illustrates behavior of the correction-amount arithmetic circuitry 134 according to Embodiment 1. The correction-amount arithmetic circuitry 134 first generates a phase command value θv2_ref (step S1). The correction-amount arithmetic circuitry 134 next arithmetically determines a phase difference value ΔP (step S2). The correction-amount arithmetic circuitry 134 then arithmetically determines a carrier-cycle correction amount Δtc (step S3).

The carrier-wave generation circuitry 135 generates a carrier wave Carrier on the basis of a carrier mode ptn received from the synchronous-pattern selection circuitry 132, the carrier-cycle correction amount Δtc received from the correction-amount arithmetic circuitry 134, and a speed command value ω_ref. Specifically, the carrier-wave generation circuitry 135 calculates a carrier cycle tc by use of an equation (3).

$$tc = 1/(ptn \times \omega\_\mathrm{ref}) + \Delta tc \tag{3}$$

The carrier-wave generation circuitry 135 then outputs a carrier wave Carrier on the basis of a carrier cycle to set such as the carrier-cycle correction amount Δtc falls into 0. Through procedures described above, a frequency of the carrier wave Carrier output from the carrier-wave generation circuitry 135 promptly falls into a frequency of ptn×ω_ref, which is an accurate frequency in the synchronization pulse, after the carrier mode is switched. The carrier-wave generation circuitry 135 sends the carrier wave Carrier to the gate-pulse generation circuitry 136. The carrier-wave generation circuitry 135 also sends, in a case in which the carrier mode ptn is 0, which indicates the non-synchronization mode, a fixed carrier frequency Carrier to the gate-pulse generation circuitry 136.

The gate-pulse generation circuitry 136 compares a three-phase voltage command value Vuvw_ref received from the voltage-phase arithmetic circuitry 133 and the carrier wave Carrier received from the carrier-wave generation circuitry 135 with each other and thus outputs a gate pulse GP. In this procedure, the gate-pulse generation circuitry 136 uses, as a comparison target, any one of a fixed carrier frequency in the normal operation and a carrier frequency in the low-noise pulse operation according to an operation-mode switching signal O_s received from the operation decision circuitry 170. Specifically, in a case in which the operation-mode switching signal O_s is "OFF", the gate-pulse generation circuitry 136 uses a fixed carrier frequency Carrier in the normal operation as a comparison target and thus outputs a gate pulse GP. At this time, the motor 21 performs the normal operation. Also, in a case in which the operation-mode switching signal O_s is "ON", the gate-pulse generation circuitry 136 uses a carrier frequency Carrier in the low-noise pulse operation as a comparison target and thus outputs a gate pulse GP. At this time, the motor 21 performs the low-noise pulse operation.

Degradation Estimation Circuitry 150

With reference back to FIG. 1, the degradation estimation circuitry 150 in the motor controller 1 is described. The degradation estimation circuitry 150 acquires an estimated degradation level W_est, which indicates an estimated level of degradation of the inverter 43, the main shaft bearing 26 of the compressor 2, and the motor 21, which may be factors of a failure in the compressor 2, according to a two-phase electric current Iuv among a three-phase alternating electric current. In addition, the inverter 43, the main shaft bearing 26 of the compressor 2, and the motor 21, which may be factors of a failure in the compressor 2, are also each referred to as an estimation target. In the first place, any one or two of the inverter 43, the main shaft bearing 26 of the compressor 2, and the motor 21 may also be used as estimation targets.

Specifically, in a two-phase electric current Iuv among a three-phase alternating electric current, sideband waves centered on a specific frequency appear for each estimation target. The degradation estimation circuitry 150 analyzes the strength level of the sideband waves, which appear in the electric current Iuv, and thus acquires an estimated degradation level W_est. In addition, with regard to the estimated degradation level W_est, in a case in which estimation targets of a plurality of type exist, for example, an estimated degradation level W_est is only required to be calculated for each type of the estimation targets and the highest estimated degradation level W_est is thus calculated.

The degradation estimation circuitry 150 may also calculate an estimated degradation level W_est on the basis of an imbalance level of a three-phase electric current Iuvw. The imbalance level of a three-phase electric current Iuvw is calculated on the basis of a U-phase and V-phase electric current Iuv and a W-phase electric current Iw acquired by use of an equation (4). In addition, the degradation estimation circuitry 150 may also calculate an estimated degradation level W_est on the basis of a value acquired by converting a three-phase electric current into a frequency area.

$$Iw = -Iu - Iv \tag{4}$$

Figure 10:
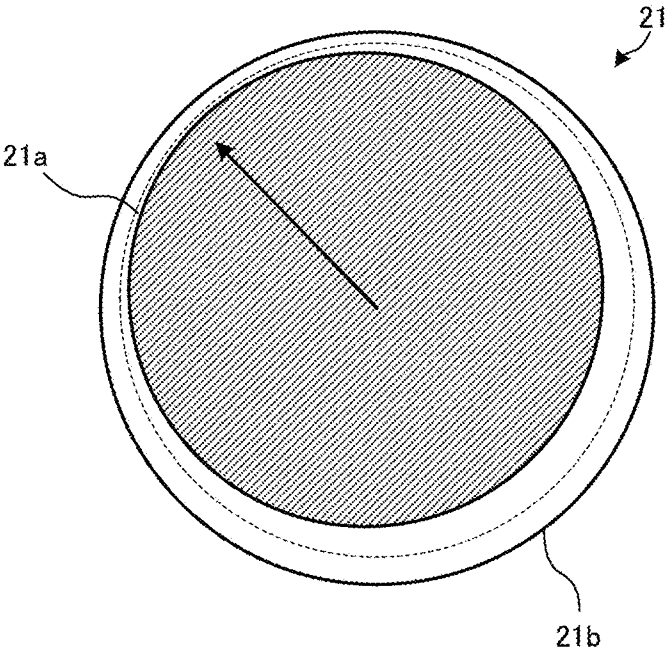
FIG. 10 is a diagram used to describe an imbalance level of a three-phase electric current according to Embodiment 1.

In addition, the imbalance level of a three-phase electric current Iuvw is caused as follows. FIG. 10 is a diagram used to describe an imbalance level of a three-phase electric current Iuvw according to Embodiment 1. When the main shaft bearing 26 of the compressor 2 degrades by various factors such as a defect in lubrication and foreign material contamination, a gap between the main shaft 23 and the main shaft bearing 26 first opens up wider as illustrated in FIG. 5 than a gap in a state in which the main shaft bearing 26 does not degrade as illustrated in FIG. 4. At this time, the main shaft 23 also starts whirling and sideband waves of a basic wave frequency are thus generated. The main shaft bearing 26 supports movement of the main shaft 23 in radial directions as illustrated in FIG. 3 and, when the gap between the main shaft 23 and the main shaft bearing 26 opens up wider, the main shaft 23 is then displaced in a direction in which the main shaft 23 inclines. Together with this displacement, as illustrated in FIG. 10, a rotor core 21*a* in the motor 21 rotates such as the rotor core 21*a* is drawn toward a stator core 21*b* by magnetic attractive force and a gap between an inner circumference of the stator core 21*b* and the rotor core 21*a* is thus non-uniform. In FIG. 10, a dotted line indicates an area in which the rotor core 21*a* is movable in the motor 21 when the main shaft bearing 26 degrades. Such a non-uniform gap disturbs balanced impedances in the motor 21 and causes a state in which impedances in respective phases are different from each other. The waveform of an electric current thus has unbalanced components.

Figure 9:
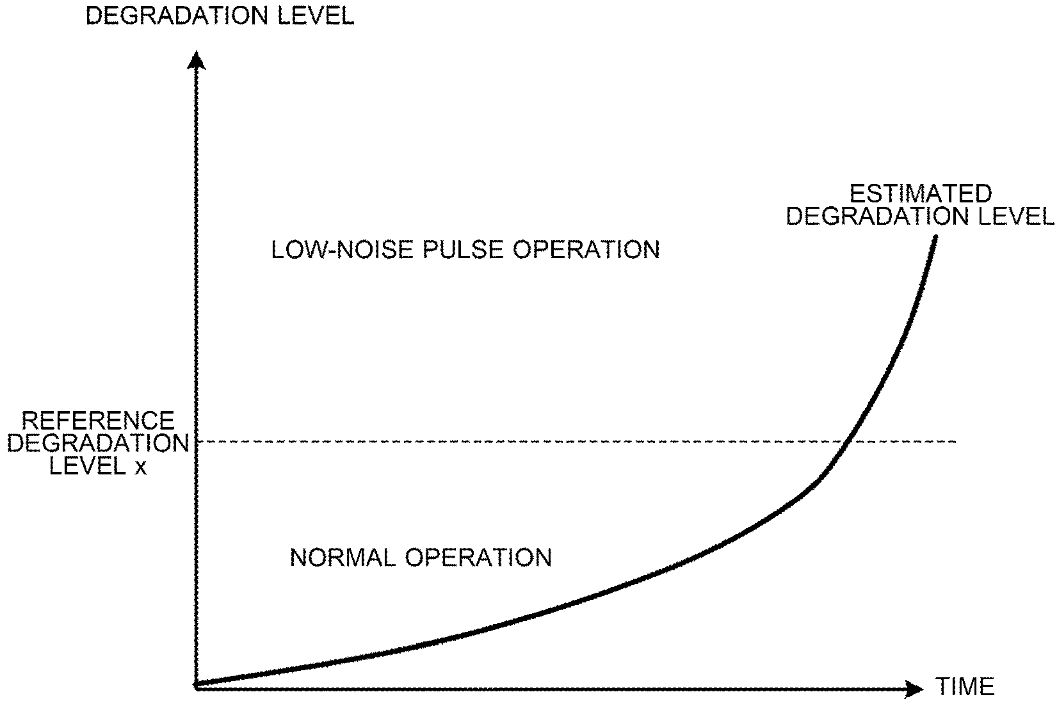
FIG. 9 is a diagram used to describe an estimated degradation level of the compressor according to Embodiment 1.

With reference to FIG. 9, the estimated degradation level W_est and a reference degradation level x are described below in detail. FIG. 9 is a diagram used to describe the estimated degradation level W_est and the reference degradation level x of the compressor 2 according to Embodiment 1. In FIG. 9, a horizontal axis indicates time and a vertical axis indicates an estimated degradation level W_est of the inverter 43 and the compressor 2. As illustrated in FIG. 9, the estimated degradation level W_est gradually increases as time elapses. The larger the estimated degradation level W_est is, the further the estimation target degrades. The reference degradation level x is preset through experimentation or other procedure such that a time period until which the compressor fails in a case in which the estimation target reaches the reference degradation level x is substantially a predetermined time period. The predetermined time period is, for example, a time period considered sufficient for a user to complete plans and preparations such as arrangement for repair.

Degradation Notification Circuitry 160

The degradation notification circuitry 160 causes, according to an estimated degradation level W_est received from the degradation estimation circuitry 150, a user terminal 200 to turn on a notification display that indicates that a device on which the motor 21 is mounted degrades. Specifically, the degradation notification circuitry 160 judges whether the estimated degradation level W_est is higher than or equal to the preset reference degradation level x. In a case in which the estimated degradation level W_est is higher than or equal to the preset reference degradation level x, the degradation notification circuitry 160 causes the user terminal 200, which is referable to FIG. 1, to turn on a notification display. The user terminal 200 is a device such as a setting monitor and a remote control, which, for example, is installed to an indoor unit of an air-conditioning apparatus and has a display and buttons. Such a setting monitor or a remote control may also have a touch display rather than combination of a display and buttons. The user terminal 200 is an example of "a display device" of the present disclosure.

Figure 11:
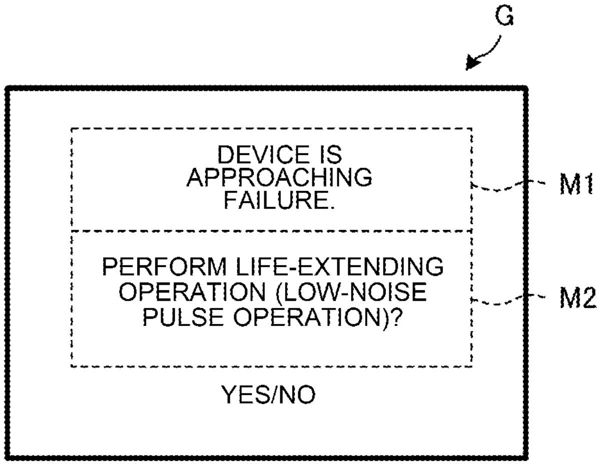
FIG. 11 is a diagram that illustrates a notification display according to Embodiment 1.

FIG. 11 is a diagram that illustrates a notification display G according to Embodiment 1. The degradation notification circuitry 160 has the notification display G, which includes, as illustrated in FIG. 11, a text M1 that provides notification that a device on which the motor 21 is mounted degrades and a text M2 that inquires whether the low-noise pulse operation is allowed to start. In addition, "LIFE-EXTENDING OPERATION" included in the text M1 is another expression of the low-noise pulse operation, which is more familiar to users. In addition, as described above, any of the inverter 43, the main shaft bearing 26 of the compressor 2, and the motor 21 is an estimation target. Such a target that may have a failure is simply expressed by "DEVICE" in FIG. 11. The degradation notification circuitry 160 is caused to turn on the notification display G and thus notifies a user that a device is to soon have a failure and prompts the user to security of maintenance resources, such as arrangement for repair.

The user terminal 200 receives operation from a user who confirms the notification display G on whether the low-noise pulse operation is allowed to start. In a case in which the user allows the life-extending operation, that is, the user selects "YES" illustrated in FIG. 11, "ON" of the low-noise pulse-operation start signal L_s is output to the operation decision circuitry 170 to the control circuitry 130. On the other hand, in a case in which the user rejects the life-extending operation, that is, the user selects "NO" illustrated in FIG. 11, "OFF" of the low-noise pulse-operation start signal L_s is output to the operation decision circuitry 170. In addition, the user terminal 200 is used not only in a case described above but also in a case in which a user inputs a setting such as a set temperature and a set air volume.

Operation Decision Circuitry 170

In a case in which the estimated degradation level W_est is higher than or equal to the reference degradation level x, the speed command value ω_ref is higher than or equal to the switching speed ω_ref1, and "ON" of the low-noise pulse-operation start signal L_s is output, the operation decision circuitry 170 sends an "ON" signal of the operation-mode switching signal O_s to the control circuitry 130. In a case in which conditions described above are not satisfied, the operation decision circuitry 170 sends an "OFF" signal of the operation-mode switching signal O_s to the control circuitry 130. When the control circuitry 130 receives the "ON" signal of the operation-mode switching signal O_s thus input, the control circuitry 130 causes the low-noise pulse operation to be performed. When the control circuitry 130 receives the "OFF" signal of the operation-mode switching signal O_s thus input, the control circuitry 130 causes the normal operation to be performed.

In a case in which the estimated degradation level W_est is higher than or equal to the reference degradation level x, the operation decision circuitry 170 causes a management device, such as a management terminal 300, which is referable to FIG. 1, installed outside the compressor 2 and used for management to turn on a display that indicates that a device on which the motor 21 is mounted degrades. Such a display notifies a manager who manages the device that the device degrades and thus allows the manager to make preparation for maintenance work. In addition, the management terminal 300 used for management is a general-purpose computer or a hardware device dedicated to manage the compressor 2.

Figure 12:
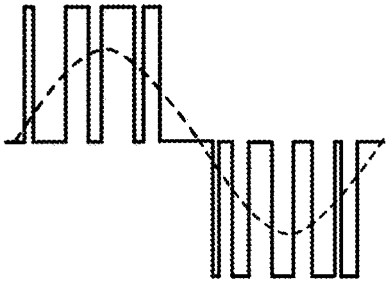
FIG. 12 is a diagram used to describe an output voltage in a normal operation according to Embodiment 1.
Figure 13:
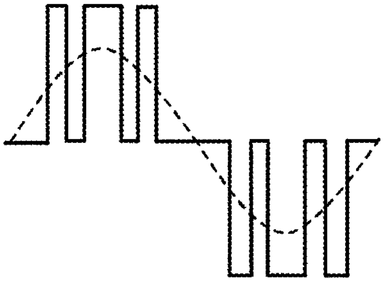
FIG. 13 is a diagram used to describe an output voltage in a low-noise pulse operation according to Embodiment 1.

With reference to FIGS. 12 and 12, output voltages in the normal operation and the low-noise pulse operation are described below. FIG. 12 is a diagram used to describe an output voltage in the normal operation according to Embodiment 1. FIG. 13 is a diagram used to describe an output voltage in the low-noise pulse operation according to Embodiment 1. In each of FIG. 12 and FIG. 13, a solid line indicates a voltage applied from the inverter 43 to the compressor 2 and a dotted line indicates any one-phase voltage command value among a three-phase voltage command value Vuvw_ref. A description is made on a case in which a U-phase voltage command value Vu_ref is illustrated in a single cycle.

In the normal operation in which the non-synchronous PWM control is exercised, when the rotation frequency of the motor 21 increases and a pulse number of the output voltage reduces, as illustrated in FIG. 12, a pulse output of the output voltage is irregular in both positive and negative directions from the single cycle of the U-phase voltage command value Vu_ref. An electric current supplied to the motor 21 is thus disturbed and, as a result, the compressor 2 is caused to have a failure.

On the other hand, in the low-noise pulse operation in which the synchronous PWM control is exercised, as illustrated in FIG. 13, a pulse output of the output voltage is significantly equal in both positive and negative directions to the single cycle of the U-phase voltage command value Vu_ref. That is, a pulse waveform of the output voltage repeats the same waveforms in both positive and negative directions in respective cycles. An electric current supplied to the motor 21 is thus not disturbed and the compressor 2 stably operates. Progress in degradation at every portion of the compressor 2 is thus made further delayed than in a case of the normal operation.

In the low-noise pulse operation, a carrier mode ptn is also generated such that, as the speed command value ω_ref increases, a frequency ratio between a carrier signal and an output voltage of the inverter 43 sequentially and gradually reduces. As the speed command value ω_ref increases, the frequency of the carrier signal thus reduces. The carrier signal is small and a switching count of the inverter 43, which is the number of switching operations of the inverter 43, thus reduces, and switching loss consequently reduces. As described above, the switching pattern of the inverter 43 is adjusted such that the switching loss in the low-noise pulse operation reduces to be less than in a case of the normal operation.

The switching loss reduces and the switching elements 43*a* and the backflow-prevention elements 43*b* in the inverter 43 are thus prevented from increasing in temperature. Progress in degradation of the inverter 43 is thus made delayed. The switching loss reduces and a switching noise, which may be produced as a transient phenomenon during the same switching is thus also reduced or eliminated and progress in degradation of the motor 21 and the main shaft bearing 26 is consequently made delayed.

In addition, in the synchronous PWM operation, switching elements 43*a* in the inverter 43 that are located in an up-down direction are substantially equal to each other in pulse output of the output voltage, a difference in progress in degradation of the switching elements 43*a* located in the up-down direction is thus reduced or eliminated. As described above, the low-noise pulse operation delays progress in degradation of the inverter 43, the main shaft bearing 26 of the compressor 2, and the motor 21, which are estimation targets.

Figure 14:
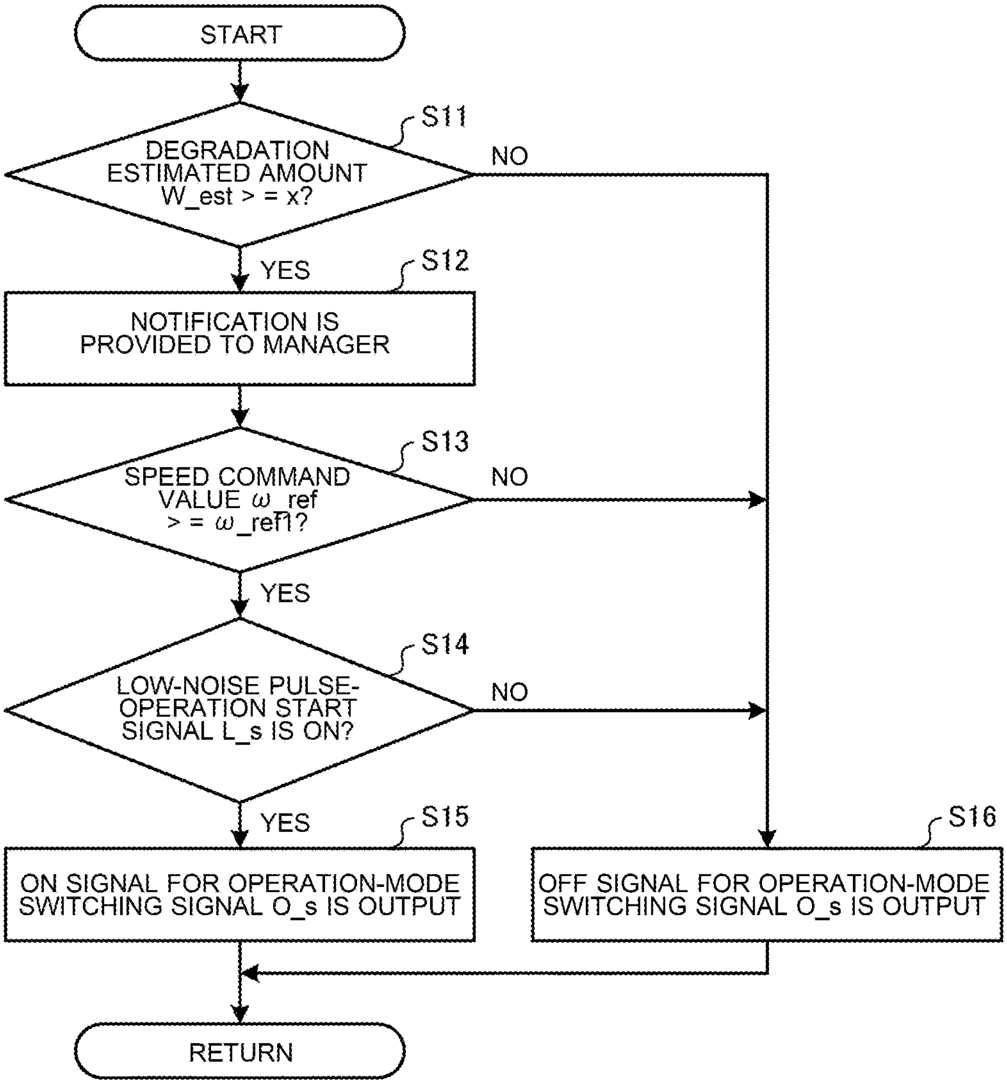
FIG. 14 is a flowchart that illustrates behavior of operation decision circuitry according to Embodiment 1.

With reference to FIG. 14, behavior of the operation decision circuitry 170 is described. FIG. 14 is a flowchart that illustrates behavior of the operation decision circuitry 170 according to Embodiment 1. The operation decision circuitry 170 first judges whether the estimated degradation level W_est is higher than or equal to the reference degradation level x (step S11). In a case in which the estimated degradation level W_est is lower than the reference degradation level x (NO in step S11), the operation decision circuitry 170 sends an "OFF" signal of the operation-mode switching signal O_s to the control circuitry 130 (step S16). Such behavior causes the motor 21 to perform the normal operation. In a case in which the estimated degradation level W_est is higher than or equal to the reference degradation level x (YES in step S11), the operation decision circuitry 170 notifies the management terminal 300 that a device on which the motor 21 is mounted degrades (step S12).

The operation decision circuitry 170 next judges whether the speed command value ω_ref is higher than or equal to the switching speed ω_ref1 (step S13). In a case in which the speed command value ω_ref is lower than the switching speed ω_ref1 (NO in step S13), the operation decision circuitry 170 sends an "OFF" signal of the operation-mode switching signal O_s to the control circuitry 130 (step S16). Such behavior causes the motor 21 to perform the normal operation. In a case in which the speed command value ω_ref is higher than or equal to the switching speed ω_ref1 (YES in step S13), the operation decision circuitry 170 judges whether the low-noise pulse-operation start signal L_s received from the degradation notification circuitry 160 is "ON" (step S14).

In a case in which the low-noise pulse-operation start signal L_s received from the degradation notification circuitry 160 is "OFF" (NO in step S14), the operation decision circuitry 170 sends an "OFF" signal of the operation-mode switching signal O_s to the control circuitry 130 (step S16). Such behavior causes the motor 21 to perform the normal operation. In a case in which the low-noise pulse-operation start signal L_s received from the degradation notification circuitry 160 is "ON" (YES in step S14), the operation decision circuitry 170 sends an "ON" signal of the operation-mode switching signal O_s to the control circuitry 130 (step S15). Such behavior causes the motor 21 to perform the low-noise pulse operation.

As described above, the motor controller 1 according to Embodiment 1 performs the low-noise pulse operation, in which the switching pattern of the inverter 43 is adjusted such that the switching loss reduces to be less than in a case of the normal operation. Degradation of the inverter 43 and the motor 21 is thus made delayed. With a device on which the motor 21 is mounted, a likelihood of downtime unpredictable for a user is thus reduced or eliminated until time elapses to a scheduled maintenance checkup.

In addition, in a case in which the motor 21 is mounted on the compressor 2, degradation of a shaft bearing of the compressor 2 is delayed. With the compressor 2, a likelihood of downtime unpredictable for a user is thus reduced or eliminated until time elapses to a scheduled maintenance checkup.

In addition, as described above, the motor controller 1 according to Embodiment 1 executes a method of controlling the motor 21 such that the motor 21 operated by electric power supplied from the power source 3 and converted by use of the electric-power converter device 4 provided with the inverter 43 is controlled. Specifically, in the method of controlling the motor 21, an estimated degradation level obtained by estimating a degradation level of a device on which the motor 21 is mounted or a degradation level of the inverter 43 is first calculated. The estimated degradation level and a reference degradation level, which is predetermined, are next compared with each other and, in a case in which the estimated degradation level is lower than the reference degradation level, an operation mode of the motor 21 is set to the normal operation, and, in a case in which the estimated degradation level is higher than or equal to the reference degradation level, the operation mode is set to the low-noise pulse operation. The inverter 43 is then controlled according to the operation mode thus set. The low-noise pulse operation reduces the switching loss to be less than in a case of the normal operation. Degradation of the inverter 43 and the motor 21 is thus made delayed. By the method of controlling the motor 21 according to Embodiment 1, with a device on which the motor 21 is mounted, a likelihood of downtime unpredictable for a user is thus reduced or eliminated until time elapses to a scheduled maintenance checkup.

Embodiment 2

Figure 15:
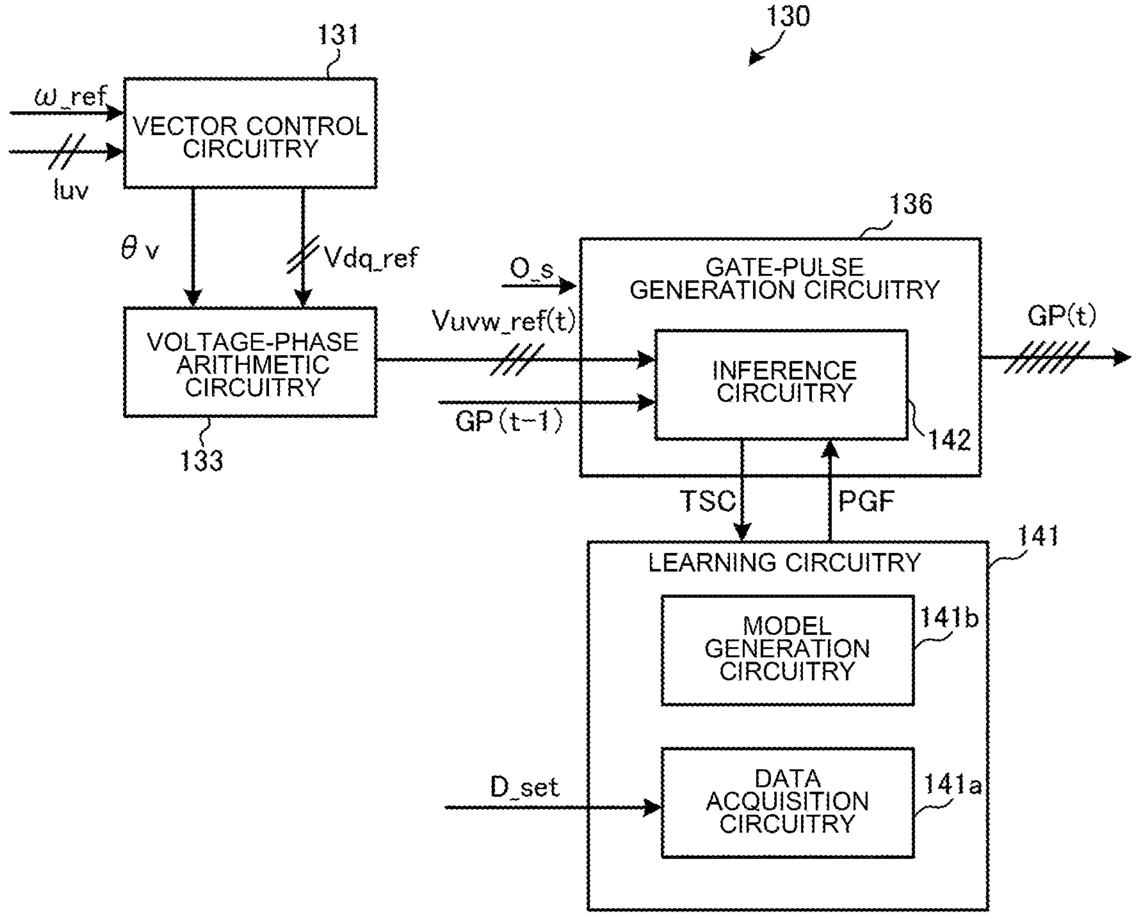
FIG. 15 is a functional block diagram that illustrates control circuitry according to Embodiment 2.

FIG. 15 is a functional block diagram that illustrates the control circuitry 130 according to Embodiment 2. As illustrated in FIG. 15, Embodiment 2 is different from Embodiment 1 in that the control circuitry 130 in the motor controller 1 has learning circuitry 141 and inference circuitry 142. Components in Embodiment 2 that are the same as Embodiment 1 have the same reference signs and are not described below. Embodiment 2 is described with a focus on differences from Embodiment 1.

The motor controller 1 according to Embodiment 2 performs the low-noise pulse operation designed to reduce switching loss to be less than in a case of the non-synchronous PWM control by use of what is referred to as an artificial intelligence (AI) through a gate pulse GP sent to the inverter 43. To a configuration of the hardware in the motor controller 1, a graphics processing unit (GPU) may also be added in addition to components described in Embodiment 1.

Voltage-Phase Arithmetic Circuitry 133

Unlike the voltage-phase arithmetic circuitry 133 in Embodiment 1, the voltage-phase arithmetic circuitry 133 in Embodiment 2 does not calculate a voltage phase θv2.

Gate-Pulse Generation Circuitry 136

The gate-pulse generation circuitry 136 has the inference circuitry 142. The gate-pulse generation circuitry 136 outputs a different gate pulse GP according to whether either operation mode of the normal operation and the low-noise pulse operation is to be performed in accordance with an operation-mode switching signal O_s. For the normal operation, a gate pulse GP with which the non-synchronous PWM control described in Embodiment 1 is exercised is output. For the low-noise pulse operation, a gate pulse GP based on information obtained through processing performed by the inference circuitry 142 is output. The inference circuitry 142 is described later.

Learning Circuitry 141

The learning circuitry 141 is configured to generate a learned model PGF used to generate a switching pattern in a gate pulse GP by use of a method of supervised learning. The learned model PGF is a program that includes a function used to generate a switching pattern by use of a parameter adjusted through a learning process. The learning circuitry 141 generates the learned model PGF when the motor 21 stably operates, in other words, when the load and the speed of the motor 21 vary slightly. A description is made below on case in which, as long as the three-phase voltage command value Vuvw_ref varies in a range lower than or equal to a predetermined value, the load and the speed of the motor 21 is determined to vary slightly, and the learning circuitry 141 thus generates the learned model PGF.

A method of generating the learned model PGF is specifically described below. The learning circuitry 141 uses, as learning data, a data set D_set obtained by adjusting three-phase voltage command values Vuvw_ref and switching patterns in gate pulses GP for a plurality of respective cycles. A control system used for the data set D_set is, for example, model predictive control, low-order harmonic elimination, and optimized pulse patterns. These control systems each reduce switching loss of the inverter 43 to be less than in a case of the non-synchronous PWM control. A switching pattern reproduced in advance and obtained in a simulation environment in which a device simulates degradation may also be used as the data set D_set. In addition, the data set D_set is stored in the memory circuitry 180 in advance.

Specifically, the data set D_set is a data set in which a plurality of switching patterns are described for respective cycles in a case in which, at an arbitrary cycle t, each of the plurality of switching patterns is in a gate pulse GP_tr(t) generated in the arbitrary cycle t when a switching pattern in a gate pulse GP_tr(t−1) generated in the previous cycle t−1 and a three-phase voltage command value Vuvw_ref_tr(t) at the arbitrary cycle t are defined.

The learning circuitry 141 has data acquisition circuitry 141*a* and model generation circuitry 141*b*. The data acquisition circuitry 141*a* acquires, from the data set D_set, as input data, a switching pattern in a gate pulse GP_tr(t−1) generated in the previous cycle t−1, which is immediately prior to the arbitrary cycle, and a three-phase voltage command value Vuvw_ref_tr(t) at the arbitrary cycle t. The data acquisition circuitry 141*a* also acquires, as a label, a switching pattern in a gate pulse GP_tr(t) generated in the arbitrary cycle t. The data acquisition circuitry 141*a* acquires a plurality of teaching data sets, which contain these input data and labels from the data set D_set, in which a plurality of switching patterns in gate pulses GP are described for respective cycles.

The model generation circuitry 141*b* proceeds a learning process such that, in a model used to output a switching pattern in a gate pulse GP(t), the switching pattern in the gate pulse GP(t) approaches a switching pattern in a gate pulse GP_tr(t) in a teaching data set on the basis of the switching pattern in the gate pulse GP_tr(t−1) generated in the previous cycle t−1, which is immediately prior to the arbitrary cycle, and the three-phase voltage command value Vuvw_ref_tr(t) at the arbitrary cycle t in the teaching data set. The model generation circuitry 141*b* performs a learning process for a model on the basis of teaching data sets for a plurality of cycles.

Specifically, the model is formed by a neural network composed of a plurality of combined perceptrons each to which a bias value and a weighting coefficient are set. The bias value and the weighting coefficient are each a parameter adjusted through a learning process. In the learning process, a plurality of pieces of teaching data are supplied to a neural network and a bias value and a weighting coefficient for each perceptron are adjusted such that an output of the neural network approaches the label. As a method of adjusting a bias value and a weighting coefficient for a perceptron, for example, back-propagation is used. In the back-propagation, the bias value and the weighting coefficient are adjusted such that a difference between the output of the neural network and the label reduces to be small.

In addition, the model generation circuitry 141*b* may also have multi-layered neural networks for a learning process and be thus configured to perform the learning process through what is referred to as deep learning.

Through a method described above, the model generation circuitry 141*b* generates a learned model PGF used to infer a switching pattern in an arbitrary cycle by use of learning data that includes a voltage command value in the arbitrary cycle and a switching pattern in a previous cycle, which is immediately prior to the arbitrary cycle. That is, the learned model PGF is used to learn a feature of the teaching data set and to output, at a time of control, the switching pattern in the gate pulse GP(t) on the basis of the switching pattern in the gate pulse GP(t−1) determined in the previous cycle and the three-phase voltage command value Vuvw_ref_tr(t) at the time of control. The learned model PGF is stored in the memory circuitry 180. The learned model PGF is used by the inference circuitry 142 to generate a gate pulse GP. In addition, FIG. 15 is simplified such that the memory circuitry 180 is not illustrated and the learned model PGF is acquired by the inference circuitry 142 from the learning circuitry 141.

Inference Circuitry 142

The inference circuitry 142 inputs, to the learned model PGF, the switching pattern in the gate pulse GP(t−1) determined in the previous cycle and the three-phase voltage command value Vuvw_ref_tr(t) at a time of control and thus acquires, at the time of control, the switching pattern in the gate pulse GP(t) to be output.

As described above, the data set D_set used for the learning process is a control pattern in a control system used to output a gate pulse GP with which switching loss of the inverter 43 reduces to be less than in a case of the non-synchronous PWM control. The learned model PGF is thus also used to output a gate pulse GP with which the switching loss of the inverter 43 reduces to be less than in a case of the non-synchronous PWM control. Control of the inverter 43 executed by the gate-pulse generation circuitry 138, which has the inference circuitry 142, by use of the learned model PGF is also referred as AI switching control in some cases below.

In addition, the learning circuitry 141 may also construct a plurality of learned models PGF for respective types of the control systems for the learning process. For example, not only a learned model PGF used to reduce switching loss but also a learned model PGF used to achieve other purpose that corresponds to a demand from a user such as reduction in oscillation of the compressor 2 may also be constructed. In a case in which a plurality of learned models PGF are constructed, a pattern table in which the learned models PGF and individual numbers assigned to respective learned models PGF correspond to each other is stored in the memory circuitry 180.

In a case in which a plurality of learned models PGF are constructed, the inference circuitry 142 generates a type-selection command TSC for a learned model PGF and outputs the type-selection command TSC to the memory circuitry 180 and thus acquires the learned model PGF that corresponds to the type-selection command TSC from the memory circuitry 180. The type-selection command TSC includes the individual numbers assigned to respective learned models PGF in the pattern table and the memory circuitry 180 is thus configured to read out the corresponding learned model PGF. In addition, FIG. 15 is simplified such that the memory circuitry 180 is not illustrated and the type-selection command TSC is output from the learning circuitry 141 to the inference circuitry 142.

Figure 16:
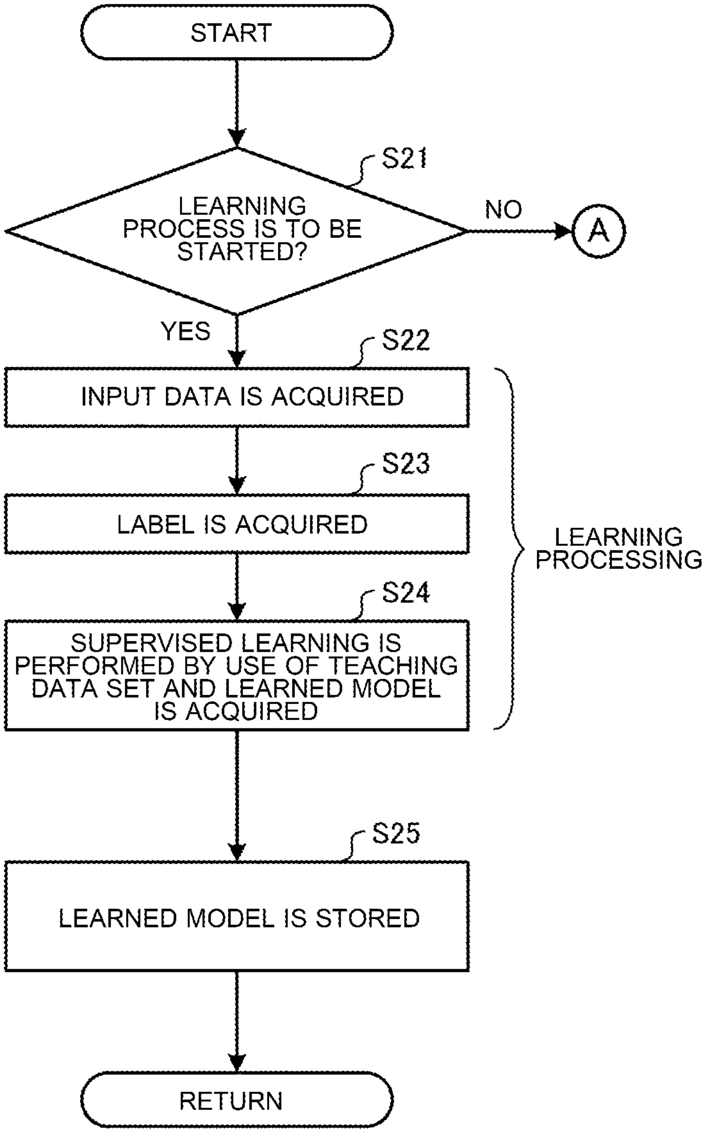
FIG. 16 is a flowchart that illustrates behavior of learning circuitry according to Embodiment 2.
Figure 17:
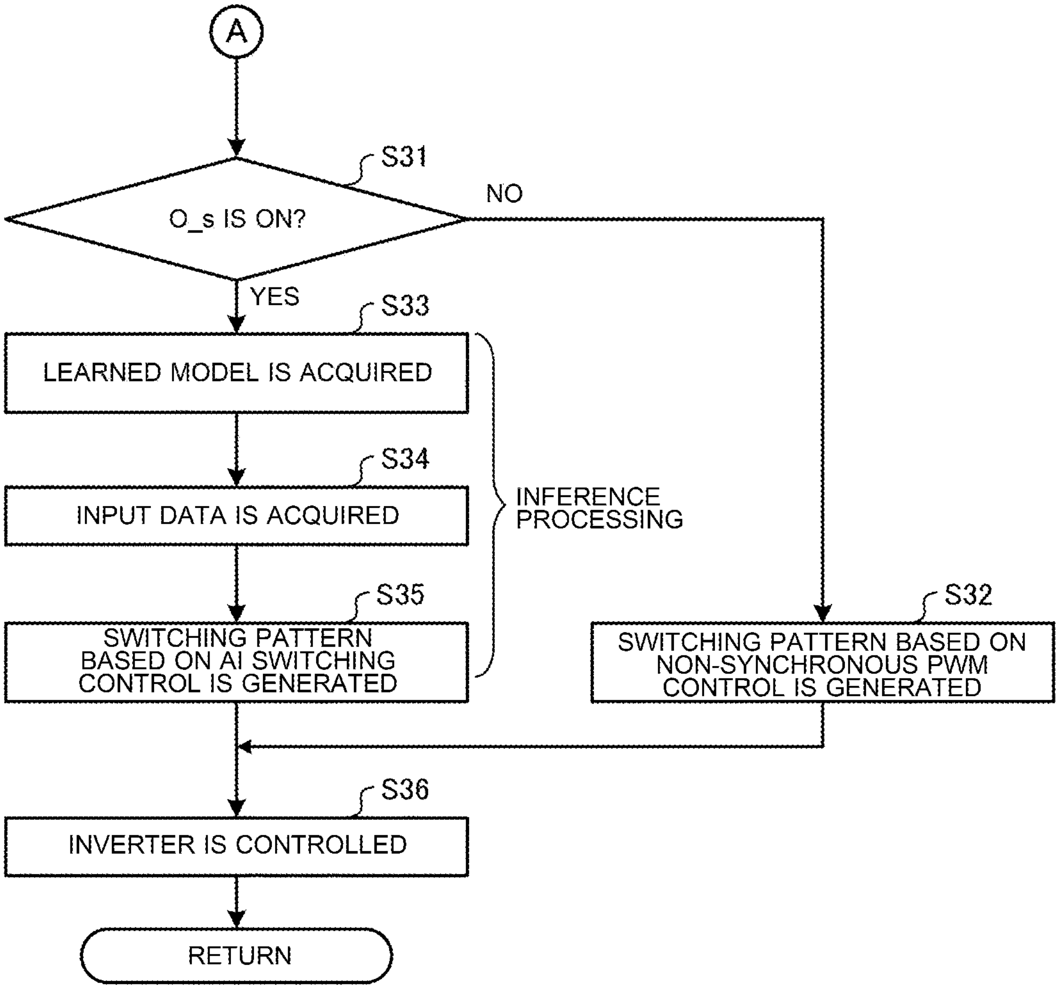
FIG. 17 is a flowchart that illustrates behavior of gate-pulse generation circuitry 136 according to Embodiment 2.

FIG. 16 is a flowchart that illustrates behavior of the learning circuitry 141 according to Embodiment 2. FIG. 17 is a flowchart that illustrates behavior of the gate-pulse generation circuitry 136 according to Embodiment 2. In addition, processing steps described below are an example of a learning method used by the learning circuitry 141. Each of the processing steps may thus also be changed to an extent possible and may thus also be omitted, replaced, and added as long as the processing steps are suited to Embodiment 2.

As illustrated in FIG. 16, the learning circuitry 141 first decides whether a learning process is to be performed (step S21). In a case in which a learning process is to be performed (YES in step S21), the data acquisition circuitry 141*a* in the learning circuitry 141 acquires input data from a piece of teaching data (step S22). Subsequently, the data acquisition circuitry 141*a* in the learning circuitry 141 acquires a label from the piece of teaching data (step S23). The model generation circuitry 141*b* in the learning circuitry 141 then performs a supervised learning by use of a teaching data set, which contains these input data and label, and thus acquires a learned model PGF (step S24). The learning circuitry 141 stores, in the memory circuitry 180, the learned model PGF thus acquired (step S25).

In a case in which a learning process is not to be performed (NO in step S21), as illustrated in FIG. 17, the gate-pulse generation circuitry 136 judges whether the operation-mode switching signal O_s is "ON" (step S31). In a case in which the operation-mode switching signal O_s is "OFF" (NO in step S31), the gate-pulse generation circuitry 136 generates a gate pulse based on the non-synchronous PWM control (step S32). The gate-pulse generation circuitry 136 then controls the inverter 43 by use of the gate pulse based on the non-synchronous PWM control (step S36), and thus causes the inverter 43 to perform the normal operation.

In a case in which the operation-mode switching signal O_s is "ON" (YES in step S31), the gate-pulse generation circuitry 136 acquires the learned model PGF stored in the memory circuitry 180 (step S33). Subsequently, the gate-pulse generation circuitry 136 acquires the switching pattern in the gate pulse GP(t−1) generated in the previous cycle, which is immediately prior to a time of control, and the three-phase voltage command value Vuvw_ref_tr(t) at the time of control, which are input data (step S34). The gate-pulse generation circuitry 136 inputs the input data into the learned model PGF and thus generates a switching pattern in a gate pulse based on the AI switching control (step S35). The gate-pulse generation circuitry 136 then controls the inverter 43 by use of the gate pulse based on the AI switching control (step S36), and thus causes the inverter 43 to perform the low-noise pulse operation.

The motor controller 1 according to Embodiment 2 also performs, similarly to Embodiment 1, the low-noise pulse operation, in which the switching pattern of the inverter 43 is adjusted such that the switching loss reduces to be less than in a case of the normal operation. Progress in degradation of the inverter 43 and the motor 21 is thus made delayed. With a device on which the motor 21 is mounted, a likelihood of downtime unpredictable for a user is thus reduced or eliminated until time elapses to a scheduled maintenance checkup.

Also in Embodiment 2, a plurality of learned models PGF are generated for respective purposes and various advantageous effects according to a demand from a user such as reduction in oscillation of the compressor 2 are thus obtained.

Embodiment 3

Figure 18:
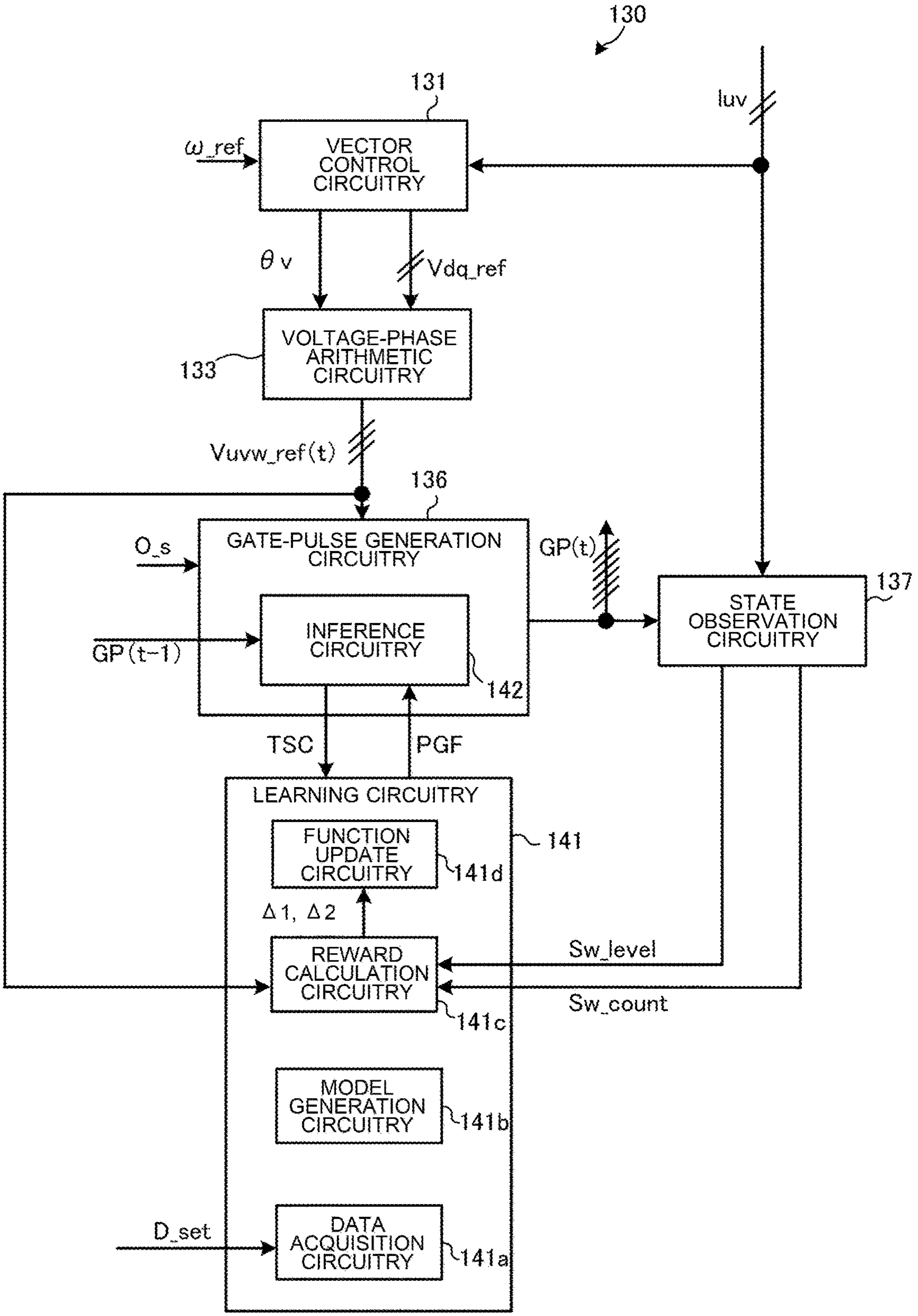
FIG. 18 is a functional block diagram that illustrates control circuitry according to Embodiment 3.

FIG. 18 is a functional block diagram that illustrates the control circuitry 130 according to Embodiment 3. As illustrated in FIG. 18, Embodiment 3 is different from Embodiment 2 in two points described below. The first difference is a point in which the motor controller 1 has state observation circuitry 137. The second difference is a point in which the learning circuitry 141 has reward calculation circuitry 141*c* and function update circuitry 141*d*. Components in Embodiment 3 that are the same as Embodiments 1 and 2 have the same reference signs and are not described below. Embodiment 3 is described with a focus on differences from Embodiments 1 and 2.

The motor controller 1 according to Embodiment 3 corresponds to the motor controller 1 according to Embodiment 2 additionally configured to perform reinforcement learning. The reinforcement learning is a learning method in which an agent is caused to perform a learning process such that a value is maximized to an extent possible in a given environment. As a representative method of the reinforcement learning, Q-learning and TD-learning are known. In the above description, the given environment corresponds to an electric current that flows through the motor 21, that is, a state of the compressor 2, the value corresponds to reduction in switching loss of the inverter 43, and the agent corresponds to the learned model PGF. That is, in Embodiment 3, while the motor 21 is controlled according to the learned model PGF generated through the supervised learning, the reinforcement learning in the low-noise pulse operation is also repeated according to the learned model PGF such that the switching loss is further reduced.

Gate-Pulse Generation Circuitry 136

The gate-pulse generation circuitry 136 acquires a learned model PGF in an initial state of the motor controller 1. The learned model PGF in the initial state is, for example, a learned model PGF acquired first after the motor 21 starts stably operating.

The gate-pulse generation circuitry 136 sends, to the inverter 43 and the state observation circuitry 137, a gate pulse GP in the non-synchronous PWM control or a gate pulse GP from the learned model PGF in the initial state of the motor controller 1, according to the operation-mode switching signal O_s. In a case in which, the learned model PGF is used, as described above, the switching pattern in the gate pulse GP(t) is output at a time of control from the switching pattern in the gate pulse GP(t−1) determined in the previous cycle and the three-phase voltage command value Vuvw_ref_tr(t) at the time of control. The gate pulse GP is output to the inverter 43, the motor 21 of the compressor 2 is driven at a speed that corresponds to the three-phase voltage command value Vuvw_ref (t).

State Observation Circuitry 137

The state observation circuitry 137 counts a switching count Sw_count from a gate pulse GP. The state observation circuitry 137 also acquires, on the basis of a resultant frequency into which any one-phase electric current of a three-phase alternating electric current Iuvw is converted, a sideband-wave strength level Sw_level, which indicates a strength level of sideband waves a of a basic frequency fa. A case in which a target converted into a frequency is a U-phase electric current Iu is described above as an example. Alternatively, a target converted into a frequency may also be another phase electric current.

Figure 19:
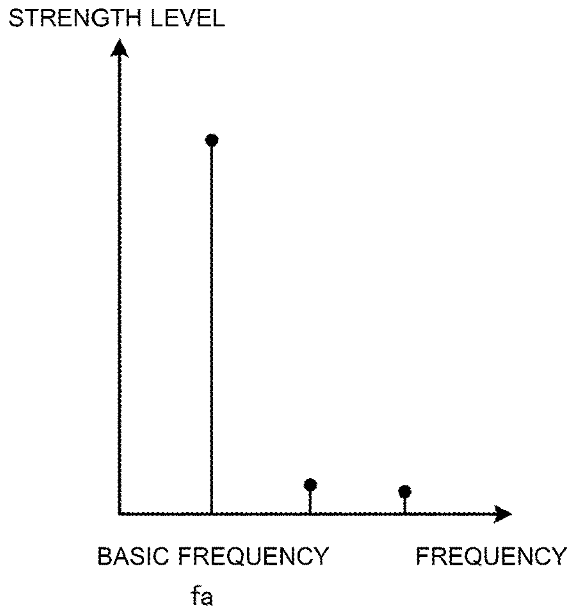
FIG. 19 is a spectrography that illustrates frequency characteristics of an electric current output to a motor according to Embodiment 3 in a normal state.
Figure 20:
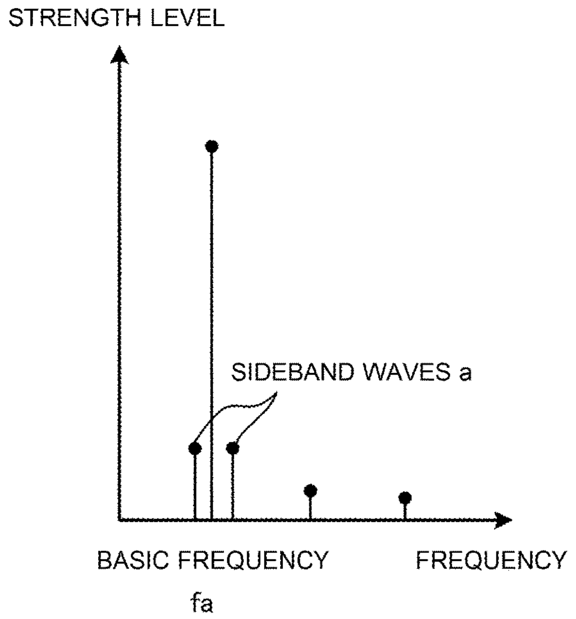
FIG. 20 is a spectrography that illustrates frequency characteristics of an electric current output to a motor according to Embodiment 3 of which degradation has progressed.

With reference to FIG. 19 and FIG. 20, a degradation state of the motor 21 is described below. FIG. 19 is a spectrography that illustrates frequency characteristics of an electric current Iu output to the motor 21 in a normal state. FIG. 20 is a spectrography that illustrates frequency characteristics of an electric current Iu output to the motor 21 of which degradation has progressed. FIG. 19 and FIG. 20 illustrate cases in which load conditions of the motor 21 are substantially the same. In FIG. 19 and FIG. 20, a vertical axis indicates "the strength level" of each frequency and a horizontal axis indicates "a frequency".

As illustrated in FIG. 19 and FIG. 20, even when the motor 21 is normal or even when degradation of the motor 21 progresses, the strength level of the basic frequency fa is higher than the other frequencies. In addition, the strength level of the basic frequency fa at a time when the motor 21 is normal and the strength level of the basic frequency fa at a time when degradation of the motor 21 progresses are substantially the same values. However, as illustrated in FIG. 20, when degradation of the motor 21 further progresses, sideband waves a centered on the basic frequency fa are generated. The further the degradation of the motor 21 progresses, the higher the sideband waves a increase. On the basis of extents of the sideband waves a centered on the basic frequency fa, that is, the sideband-wave strength level Sw_level, the level in degradation of the motor 21 is thus allowed to be decided. In addition, the degradation of the motor 21 described above is, among what are referred as initial degradation and latter degradation, the initial degradation. The latter degradation causes irreversible change. On the other hand, the initial degradation changes whether a whirling phenomenon occurs according to an effect of a load applied to the motor 21 and thus changes the sideband-wave strength level Sw_level.

Reward Calculation Circuitry 141*c*

The reward calculation circuitry 141*c* determines a reward on the basis of the sideband-wave strength level Sw_level arithmetically determined by the state observation circuitry 137. Specifically, the reward calculation circuitry 141*c* judges whether the sideband-wave strength level Sw_level arithmetically determined by the state observation circuitry 137 is lower than or equal to a default value. In a case in which the reward calculation circuitry 141*c* judges that the sideband-wave strength level Sw_level is lower than or equal to the default value, the reward calculation circuitry 141*c* increases an amount of change Δ1 preset as a reward. In contrast, in a case in which the reward calculation circuitry 141*c* judges that the sideband-wave strength level Sw_level is higher than the default value, the reward calculation circuitry 141*c* reduces the preset amount of change Δ1.

Similarly, the reward calculation circuitry 141*c* determines a reward on the basis of the switching count Sw_count arithmetically determined by the state observation circuitry 137. Specifically, the reward calculation circuitry 141*c* judges whether the switching count Sw_count arithmetically determined by the state observation circuitry 137 reduces from a switching count Sw_count based on a pre-update learned model PGF. In a case in which the switching count Sw_count reduces from the switching count Sw_count based on the pre-update learned model PGF, the reward calculation circuitry 141*c* increases an amount of change Δ2 preset as a reward. In contrast, in a case in which the switching count Sw_count increases from the switching count Sw_count based on the pre-update learned model PGF, the reward calculation circuitry 141*c* reduces the preset amount of change 42. In addition, a reward based on the switching count Sw_count may also be determined through comparison to a specified value, which is predetermined.

Function Update Circuitry 141*d*

The function update circuitry 141*d* updates a value function on the basis of the amount of change Δ1 and the amount of change Δ2 obtained as the reward by the reward calculation circuitry 141*c*. Specifically, a weighting coefficient and a bias are adjusted such that the amount of change Δ1 and the amount of change Δ2 are to be maximized to an extent possible. Such adjustment updates the value function such that the switching count reduces while the strength level of sideband waves a remains in a range lower than or equal to the default value. In addition, such reduction in the switching count also causes reduction in the switching loss. The learned model is then updated on the basis of the updated value function. The value function is used for, for example, Q-learning, which is publicly known. Such update of the learned model is adjustment of the weighting coefficient and the bias for each perceptron in the neural network that forms the learned model.

Figure 21:
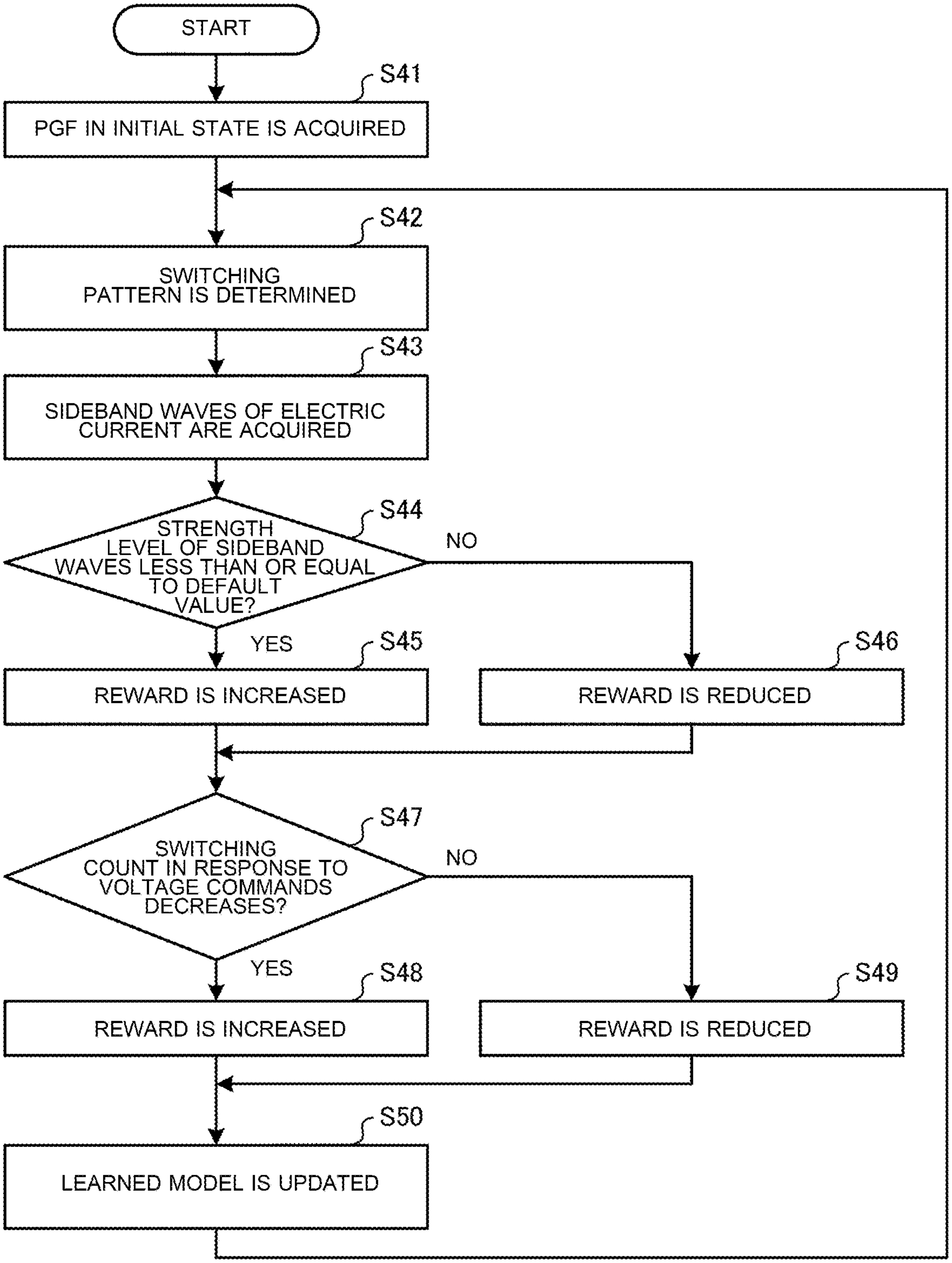
FIG. 21 is a flowchart that illustrates behavior of learning circuitry and state observation circuitry according to Embodiment 3.

FIG. 21 is a flowchart that illustrates behavior of the learning circuitry 141 and the state observation circuitry 137 according to Embodiment 3. In addition, processing steps described below are an example of a learning method used by the learning circuitry 141. Each of the processing steps may also be changed to an extent possible and may also be omitted, replaced, and added as long as the processing steps are suited.

The learning circuitry 141 first acquires a learned model PGF in an initial state of the motor controller 1 (step S41). The learning circuitry 141 next determines a switching pattern on the basis of the acquired learned model PGF (step S42) and the state observation circuitry 137 then acquires the strength level of sideband waves in an electric current that flows through the motor 21 at this time (step S43).

The reward calculation circuitry 141*c* in the learning circuitry 141 judges whether the strength level of sideband waves in an electric current that flows through the motor 21 is higher than or equal to a specified value (step S44). In a case in which the strength level of sideband waves in an electric current that flows through the motor 21 is lower than or equal to the specified value (YES in step S44), the reward calculation circuitry 141*c* increases a reward (step S45). In a case in which the strength level of sideband waves in an electric current that flows through the motor 21 is lower than the specified value (NO in step S44), the reward calculation circuitry 141*c* reduces the reward (step S46).

The reward calculation circuitry 141*c* judges whether the switching count in response to a voltage command reduces from the switching count Sw_count based on a pre-update learned model PGF (step S47). In a case in which the switching count in response to a voltage command reduces from the switching count Sw_count based on a pre-update learned model PGF (YES in step S47), the reward calculation circuitry 141*c* increases the reward (step S48). In a case in which the switching count in response to a voltage command increases from the switching count Sw_count based on a pre-update learned model PGF (NO in step S47), the reward calculation circuitry 141*c* reduces the reward (step S49). The function update circuitry 141*d* in the learning circuitry 141 updates the learned model PGF on the basis of the reward given on the basis of the strength level of sideband waves in an electric current that flows through the motor 21 and the reward given on the basis of the switching count in response to a voltage command. The processing from step S42 to step S50 is then repeated and a learned model PGF is thus obtained that forms a switching pattern with which the switching loss is further reduced.

The motor controller 1 according to Embodiment 3 also performs, similarly to Embodiments 1 and 2, the low-noise pulse operation, in which the switching pattern of the inverter 43 is adjusted such that the switching loss reduces to be less than in a case of the normal operation. Progress in degradation of the inverter 43 and the motor 21 is thus made delayed. With a device on which the motor 21 is mounted, a likelihood of downtime unpredictable for a user is thus reduced or eliminated until time elapses to a scheduled maintenance checkup.

Also in Embodiment 3, the learned model generated in Embodiment 2 is updated. In Embodiment 3, every time the learned model PGF is updated, the switching loss of the inverter 43 thus reduces to be less than in a case of the learned model in Embodiment 2.

Embodiment 4

Figure 22:
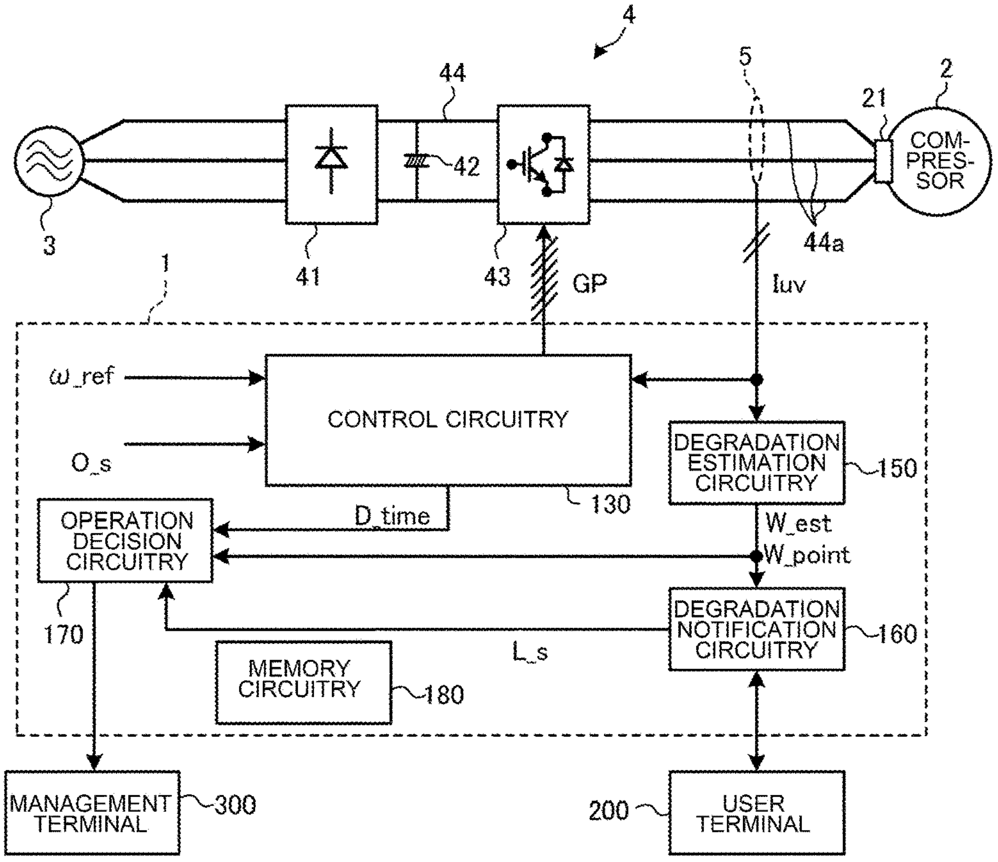
FIG. 22 is a schematic configuration diagram that illustrates a compressor, a power source, and an electric-power converter device according to Embodiment 4.

FIG. 22 is a schematic configuration diagram that illustrates the compressor 2, the power source 3, and the electric-power converter device 4 according to Embodiment 4. Embodiment 4 is different from Embodiments 1 to 3 in three points described below. The first difference is, as illustrated in FIG. 22, a point in which the degradation estimation circuitry 150 sends a degraded location W_point to the operation decision circuitry 170. The second difference is a point in which the control circuitry 130 sends a driving time D_time to the operation decision circuitry 170. The third difference is a point in which the non-synchronous PWM control described as the low-noise pulse operation in Embodiment 1 and control by use of the AI switching control described in Embodiments 2 and 3 are separately used from each other. Components in Embodiment 4 that are the same as Embodiments 1 to 3 have the same reference signs and are not described below. Embodiment 4 is described with a focus on differences from Embodiments 1 to 3.

Degradation Estimation Circuitry 150

The degradation estimation circuitry 150 specifies a degraded location W_point on the basis of a resultant frequency into which a U-phase electric current Iu of a three-phase alternating electric current is converted. A case in which a target converted into a frequency is a U-phase electric current Iu is described above as an example. Alternatively, a target converted into a frequency may also be another phase electric current. The degradation estimation circuitry 150 outputs the degraded location W_point thus specified to the operation decision circuitry 170. The degraded location W_point includes information that indicates either one of the motor 21 and the inverter 43.

Figure 23:
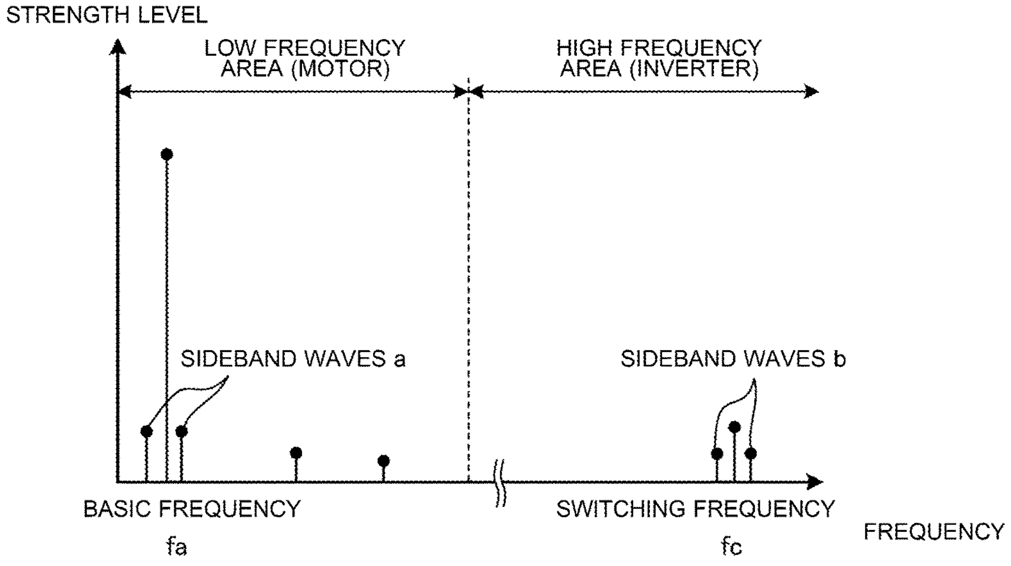
FIG. 23 is a spectrography that illustrates frequency characteristics of an electric current output to a motor according to Embodiment 4 of which degradation has progressed.

With reference to FIG. 23, a method of deciding a degraded location is described. FIG. 23 is a spectrography that illustrates frequency characteristics of an electric current output to the motor 21 according to Embodiment 4 of which degradation has progressed. In FIG. 23, a vertical axis indicates "the strength level" of each frequency and a horizontal axis indicates "a frequency". As illustrated in FIG. 23, in a case in which the motor 21 degrades, sideband waves a centered on the basic frequency fa are generated. In a case in which the inverter 43 degrades, sideband waves b centered on a switching frequency fc are also generated. In a case in which a frequency area around the basic frequency fa is defined as a low frequency area and a frequency area around the switching frequency fc is defined as a high frequency area, when sideband waves a exist in the low frequency area, it is decided that the motor 21 degrades. Similarly, when sideband waves b exist in the high frequency area, it is decided that the inverter 43 degrades. The degradation estimation circuitry 150 sets, through such method of deciding a degraded location, information that indicates either one of the motor 21 and the inverter 43 to the degraded location W_point and outputs the degraded location W_point with such information to the degradation notification circuitry 160 and the control circuitry 130.

Degradation Notification Circuitry 160

The degradation notification circuitry 160 causes, according to the degraded location W_point, the user terminal 200 to turn on a notification display that indicates that either one of the motor 21 and the inverter 43 degrades.

Control Circuitry 130

The control circuitry 130 totals up a driving time D_time of the compressor 2. The driving time D_time is obtained by, for example, counting an actual driving time of the compressor 2 according to factors such as a gate pulse GP generated at the control circuitry 130 and a two-phase electric current Iuv among a three-phase alternating electric current. The control circuitry 130 outputs the driving time D_time to the operation decision circuitry 170.

The control circuitry 130 also performs the normal operation, the low-noise pulse operation based on the synchronous PWM control described in Embodiment 1, or the low-noise pulse operation based on the AI switching control described in Embodiments 2 and 3. The operation mode is determined by the operation-mode switching signal O_s received from the operation decision circuitry 170. The operation-mode switching signal O_s indicates either one of "1", which indicates the normal operation, "2", which indicates the low-noise pulse operation based on the synchronous PWM control, and "3", which indicates the low-noise pulse operation based on the AI switching control.

Operation Decision Circuitry 170

The operation decision circuitry 170 switches the operation-mode switching signal O_s to either one of "1", "2", and "3" on the basis of the estimated degradation level W_est, the driving time D_time, the low-noise pulse-operation start signal L_s, and the degraded location W_point and then outputs the operation-mode switching signal O_s to the control circuitry 130. Specifically, in a case in which one of degradation estimation conditions described below is satisfied and an "ON" signal of the low-noise pulse-operation start signal L_s is output, the operation decision circuitry 170 sends a "2" signal or a "3" signal of the operation-mode switching signal O_s to the control circuitry 130. The first one of the degradation estimation conditions is a case in which the estimated degradation level W_est is higher than or equal to the reference degradation level x. The second one of the degradation estimation conditions is a case in which the driving time D_time is equal to a reference driving time y. The reference driving time y is preset through experimentation or other procedure such that, when a culminated driving time period of the compressor 2 is equal to the reference driving time y, a time period until which such a compressor 2 fails is substantially a predetermined time period. The predetermined time period is, for example, a time period considered sufficient for a user to complete plans and preparations such as arrangement for repair. In a case in which one of the degradation estimation conditions is satisfied, the operation decision circuitry 170 provides notification to a manager irrespective of the low-noise pulse-operation start signal L_s.

In addition, when the estimation target indicated by the degraded location W_point is the motor 21, the operation decision circuitry 170 sends a “2” signal of the operation-mode switching signal O_s to the control circuitry 130. When the control circuitry 130 receives the “2” signal of the operation-mode switching signal O_s thus input, the control circuitry 130 performs the low-noise pulse operation based on the synchronous PWM control. In contrast, when the estimation target indicated by the degraded location W_point is the inverter 43, the operation decision circuitry 170 sends a “3” signal of the operation-mode switching signal O_s to the control circuitry 130. When the control circuitry 130 receives the “3” signal of the operation-mode switching signal O_s thus input, the control circuitry 130 performs the low-noise pulse operation based on the AI switching control.

In a case in which the degradation estimation conditions are not satisfied or an “OFF” signal of the low-noise pulse-operation start signal L_s is output, the operation decision circuitry 170 sends a “1” signal of the operation-mode switching signal O_s to the control circuitry 130. When the control circuitry 130 receives the “1” signal of the operation-mode switching signal O_s thus input, the control circuitry 130 performs the normal operation.

Figure 24:
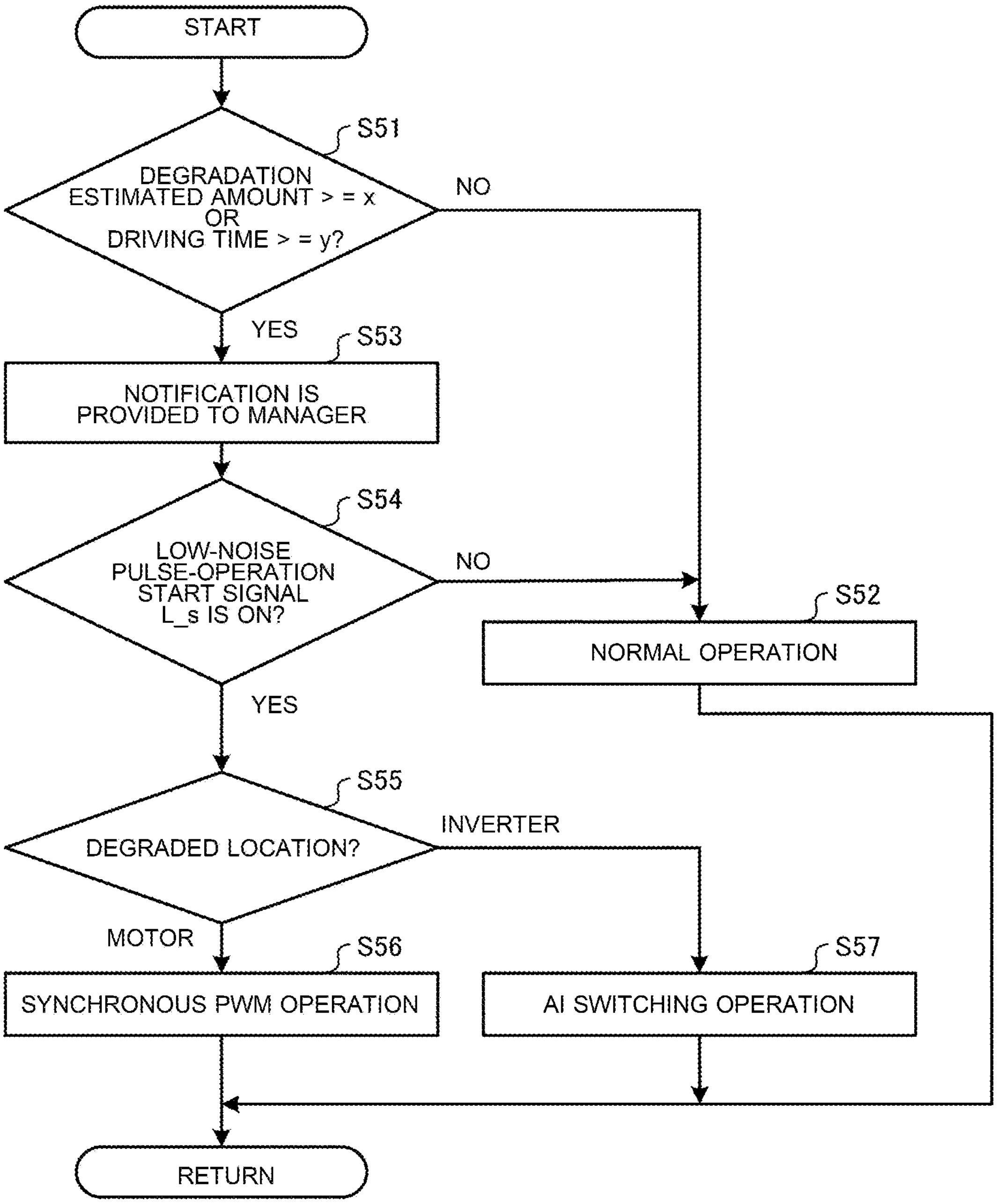
FIG. 24 is a flowchart that illustrates behavior of operation decision circuitry according to Embodiment 4.

FIG. 24 is a flowchart that illustrates behavior of the operation decision circuitry 170 according to Embodiment 4. In addition, processing steps described below are an example of a method of determining the operation mode. Each of the processing steps may also be changed to an extent possible and may also be omitted, replaced, and added as long as the processing steps are suited.

The operation decision circuitry 170 first decides whether the degradation estimation conditions are satisfied (step S51). In a case in which the degradation estimation conditions are not satisfied (NO in step S51), the operation decision circuitry 170 sends a “1” signal of the operation-mode switching signal O_s, which indicates the normal operation, to the control circuitry 130 (step S52). In a case in which one of the degradation estimation conditions is satisfied (YES in step S51), the operation decision circuitry 170 provides notification to a manager (step S53) and judges whether the low-noise pulse-operation start signal L_s is “ON” (step S54). In a case in which the low-noise pulse-operation start signal L_s is “OFF” (NO in step S54), the operation decision circuitry 170 sends a “1” signal of the operation-mode switching signal O_s, which indicates the normal operation, to the control circuitry 130 (step S52).

In a case in which the low-noise pulse-operation start signal L_s is “ON” (YES in step S54), the operation decision circuitry 170 judges the estimation target indicated by the degraded location W_point (step S55). In a case in which the degraded location W_point indicates the motor 21 (“MOTOR 21” in step S55), a “2” signal of the operation-mode switching signal O_s, which indicates the low-noise pulse operation based on the synchronous PWM control, is sent to the control circuitry 130 (step S56). In a case in which the degraded location W_point indicates the inverter 43 (“INVERTER 43” in step S55), a “3” signal of the operation-mode switching signal O_s, which indicates the low-noise pulse operation based on the AI switching control, is sent to the control circuitry 130 (step S57).

The motor controller 1 according to Embodiment 4 also performs, similarly to Embodiments 1 and 3, the low-noise pulse operation, in which the switching pattern of the inverter 43 is adjusted such that the switching loss reduces to be less than in a case of the normal operation. Progress in degradation of the inverter 43 and the motor 21 is thus made delayed. With a device on which the motor 21 is mounted, a likelihood of downtime unpredictable for a user is thus reduced or eliminated until time elapses to a scheduled maintenance checkup.

The motor controller 1 according to Embodiment 4 is also configured to judge the degraded location on the basis of an electric current output to the motor 21. The motor controller 1 according to Embodiment 4 further switches, for the corresponding one of the degraded locations, the low-noise pulse operation based on the synchronous PWM control and the low-noise pulse operation based on the AI switching control. Incidentally, the synchronous PWM control determines switching on the basis of a basic wave frequency, which is also referred as a driving rotation frequency, and is thus suited to lower noises in driving of the motor 21. In contrast, the AI switching control also counts the carrier frequency, that is, sideband waves in a high frequency around the basic wave frequency, which is also referred as a driving rotation frequency, and is thus suited to lower noises related to the inverter 43. As described above, the low-noise pulse operation suited to the degraded location is performed and progress in degradation of the inverter 43 and the motor 21 is thus made further delayed. With a device on which the motor 21 is mounted, a likelihood of downtime unpredictable for a user is thus further reduced or eliminated until time elapses to a scheduled maintenance checkup.

Embodiment 5

Figure 25:
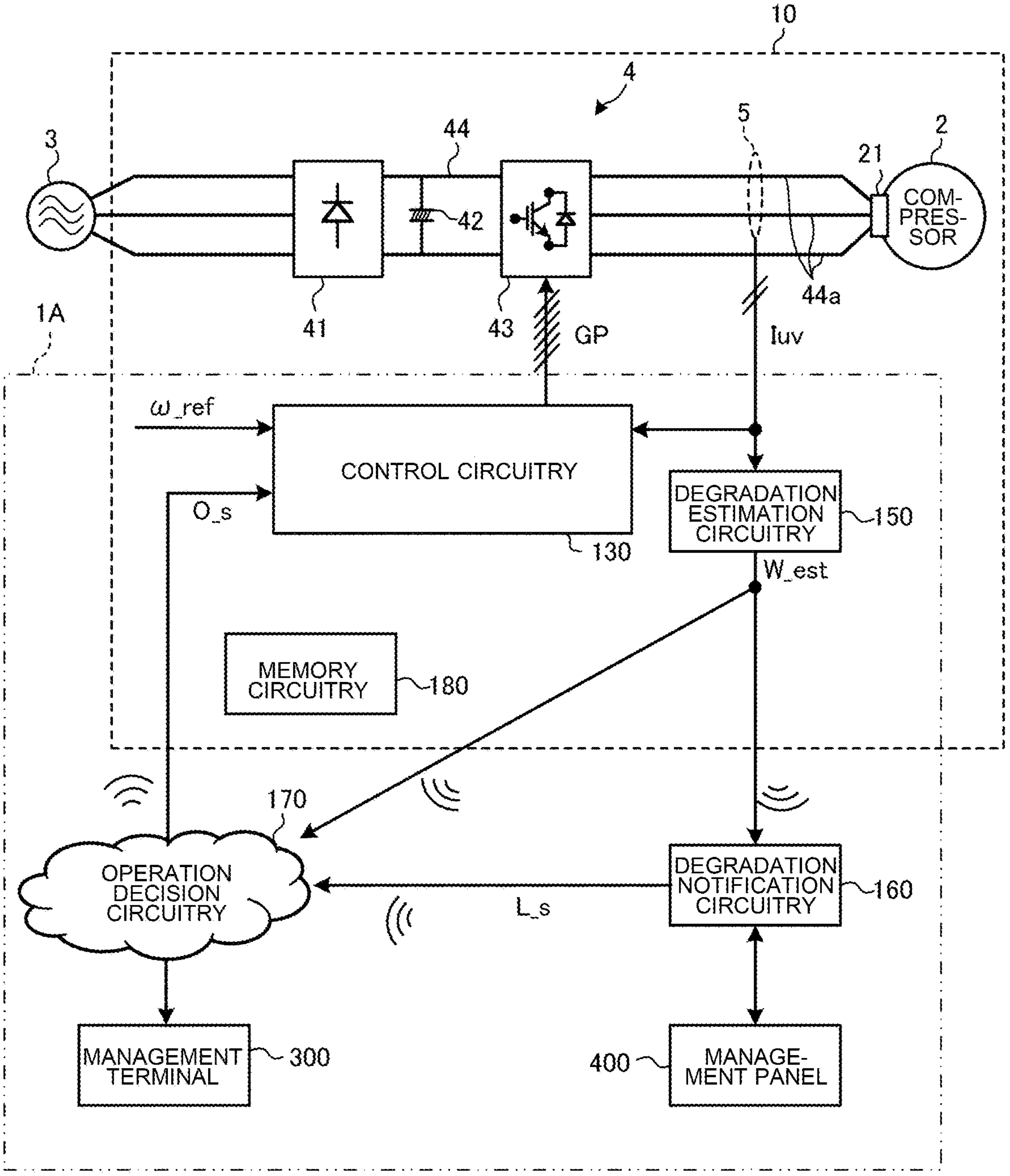
FIG. 25 is a schematic configuration diagram that illustrates a compressor, a power source, and an electric-power converter device according to Embodiment 5.

FIG. 25 is a schematic configuration diagram that illustrates the compressor 2, the power source 3, and the electric-power converter device 4 according to Embodiment 5. Embodiment 5 is different from Embodiments 1 to 4 in points in which the operation decision circuitry 170 and the degradation notification circuitry 160 are located outside a control unit 10, which is formed by the control circuitry 130, the degradation estimation circuitry 150, the power source 3, and the electric-power converter device 4, and the motor control system 1A is provided that executes the method of controlling the motor 21 described in Embodiments 1 to 4. Components in Embodiment 5 that are the same as Embodiments 1 to 4 have the same reference signs and are not described below. Embodiment 5 is described with a focus on differences from Embodiments 1 to 4.

Control Unit 10

The control circuitry 130 and the degradation estimation circuitry 150 of the motor controller 1, the power source 3, and the electric-power converter device 4 are, as the control unit 10, installed in a control box. Embodiment 5 is described with a case in which the compressor 2 is installed in an air-conditioning apparatus and the air-conditioning apparatus is installed in a facility such as a building. The control unit 10 is installed outside a facility such as on a roof of a building. The degradation estimation circuitry 150 in the control unit 10 sends an estimated degradation level W_est to the degradation notification circuitry 160 and the operation decision circuitry 170. In addition, the control circuitry 130 in the control unit 10 receives an operation-mode switching signal O_s from the operation decision circuitry 170.

Degradation Notification Circuitry 160

The degradation notification circuitry 160 is, for example, as a functional section of a management panel 400 installed indoors such as inside a management room or other facility, software or other programs installed in a controller of the management panel 400. To the management panel 400, a display and operation buttons are provided, by which a user is allowed to confirm and input a setting for behavior of an air-conditioning apparatus. The management panel 400 may also have a touch display rather than combination of a display and operation buttons. The degradation notification circuitry 160 establishes wired or wireless communication with the control unit 10 and receives the estimated degradation level W_est from the degradation estimation circuitry 150 in the control unit 10. The degradation notification circuitry 160 causes, according to the received estimated degradation level W_est, the display to turn on a notification display that indicates that a device on which the motor 21 is mounted degrades. The display of the management panel 400 is an example of "a display device" of the present disclosure.

Operation Decision Circuitry 170

The operation decision circuitry 170 is, for example, as a functional section of a server device, software or other programs installed in the server device. The operation decision circuitry 170 establishes communication via the Internet with the control unit 10 and receives the estimated degradation level W_est from the degradation estimation circuitry 150 in the control unit 10. The operation decision circuitry 170 also sends the operation-mode switching signal O_s to the control unit 10. Specific behavior is the same as described in Embodiments 1 to 4. In addition, the operation decision circuitry 170 may also be a functional section in a cloud server rather than a functional section in a physical server.

The motor control system 1A according to Embodiment 5 also performs, similarly to Embodiments 1 and 4, the low-noise pulse operation, in which the switching pattern of the inverter 43 is adjusted such that the switching loss reduces to be less than in a case of the normal operation. Progress in degradation of the inverter 43 and the motor 21 is thus made delayed. With a device on which the motor 21 is mounted, a likelihood of downtime unpredictable for a user is thus reduced or eliminated until time elapses to a scheduled maintenance checkup.

Each embodiment presently disclosed is an example at all points and should be considered nonlimiting. The scope of the present disclosure is not specified by the description made above but is specified by the scope of claims. It is also specified that the scope of the present disclosure includes equivalence in meaning to the scope of claims and all changes within the scope of the claims. In addition, it is also specified that forms described in embodiments and modifications are established, to an extent possible, both in a case in which the forms are singly used and in a case in which the forms are combined with each other. For example, in each embodiment, a period before which the inverter 43 or the compressor 2 is usually replaced, a timing of replacement recommend on the basis of an estimated degradation level W_est and a reference degradation level x, or a timing of replacement recommend on the basis of a driving time D_time and a reference driving time y may also be presented.

In addition, in each embodiment, a mobile terminal, which a user carries, may also be configured to turn on a notification display. In this case, the degradation notification circuitry 160 is dedicated software installed in the mobile terminal, which the user carries. In this case, the user is allowed to recognize degradation of the inverter 43 and the motor 21 even from a remote location. Arrangement for repair and maintenance work are thus speeded up. In addition, the display of the mobile terminal is an example of "a display device" of the present disclosure.

Figure 26:
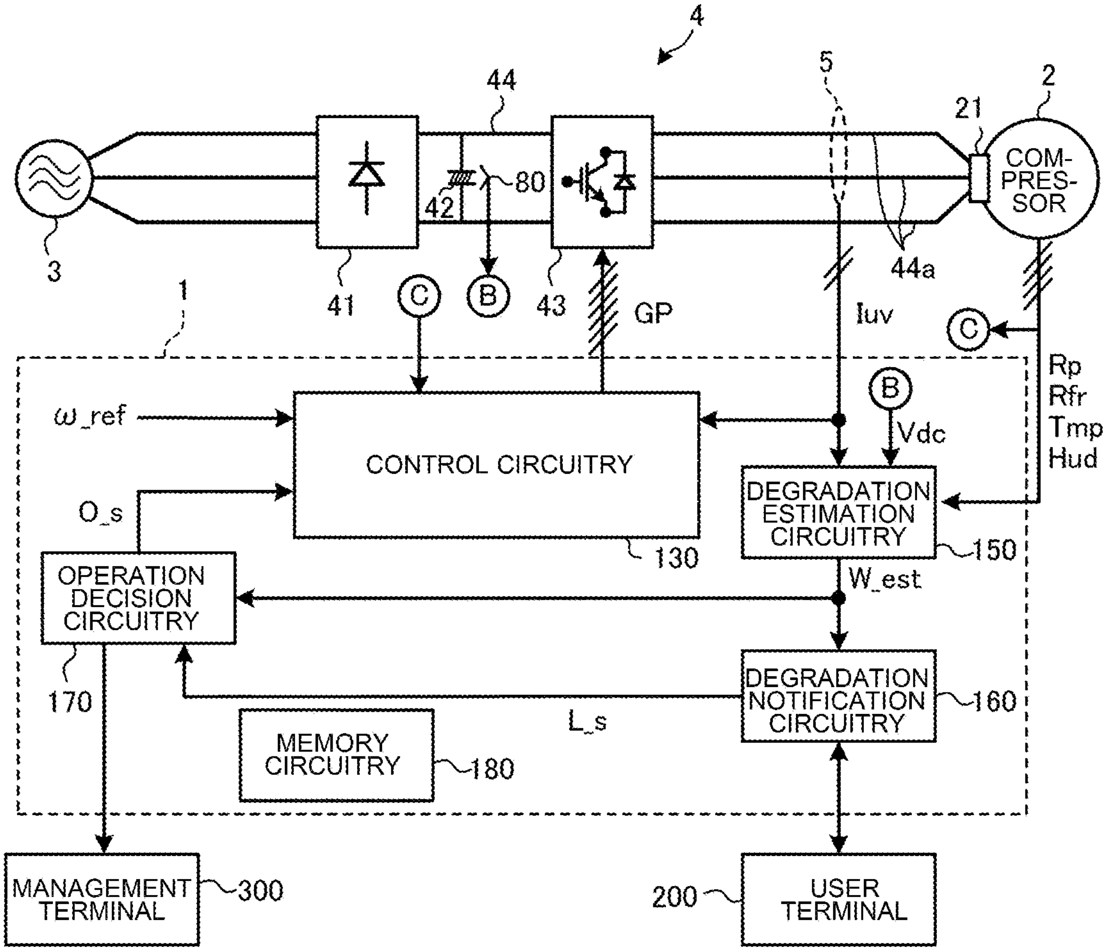
FIG. 26 is a schematic configuration diagram that illustrates a compressor, a power source, and an electric-power converter device according to a modification of Embodiment 1.

In addition, a method of acquiring an estimated degradation level W_est in Embodiment 1 may also be changed as follows. FIG. 26 is a schematic configuration diagram that illustrates the compressor 2, the power source 3, and the electric-power converter device 4 according to a modification of Embodiment 1. As illustrated in FIG. 26, to the electric-power converter device 4, a voltage sensor 6 is provided that detects a bus voltage Vdc. The degradation estimation circuitry 150 acquires the bus voltage detected by the voltage sensor 6. The degradation estimation circuitry 150 acquires a refrigerant pressure Rp, a refrigerant flow rate Rfr, an ambient temperature Tmp, and an ambient humidity Hud from the pressure sensor 71, the flow-rate sensor 72, the temperature sensor 73, and the humidity sensor 74 described in Embodiment 1. The degradation estimation circuitry 150 may also acquire an estimated degradation level W_est on the basis of the bus voltage Vdc, the refrigerant pressure Rp, the refrigerant flow rate Rfr, the ambient temperature Tmp, and the ambient humidity Hud. In addition, such a modification is applicable not only to Embodiment 1 but also to Embodiments 2 to 5 although resultant modifications are unillustrated.

In addition, in Embodiment 2, a learned model PGF may also be generated for, in addition to reduction in switching loss, another purpose on the basis of the electric current Iuv, the bus voltage Vdc, the refrigerant pressure Rp, the refrigerant flow rate Rfr, the ambient temperature Tmp, and the ambient humidity Hud. Such a purpose other than reduction in switching loss is, for example, either one of a driving sound, oscillation, and an electric current harmonic of the compressor 2 and a voltage applied to the inverter 43. In this case, the electric current Iuv, the bus voltage Vdc, the refrigerant pressure Rp, the refrigerant flow rate Rfr, the ambient temperature Tmp, and the ambient humidity Hud are used as input data to the learned model PGF.

In addition, in Embodiment 5, a form in which the operation decision circuitry 170 and the degradation notification circuitry 160 are located outside the control unit 10, which is formed by the control circuitry 130, the degradation estimation circuitry 150, the power source 3, and the electric-power converter device 4, is referred to as the motor control system 1A. The motor control system is, however, not limited to the form described above. The motor control system is only required to have either one of the degradation estimation circuitry 150, the degradation notification circuitry 160, and the operation decision circuitry 170 outside the control unit 10 formed by the control circuitry 130, the power source 3, and the electric-power converter device 4. In this case, the degradation estimation circuitry 150, the degradation notification circuitry 160, or the operation decision circuitry 170 is, for example, software or other programs as a functional section of a hardware device or a CPU, which is different from a motor controller on which the control circuitry 130 is mounted, or a server device such as a cloud server. In addition, with the motor control system, a feature of the motor controller 1 described in Embodiments 1 to 4 may also be combined.

In addition, in each embodiment, according to an extent to which an estimated degradation level exceeds the reference degradation level, the operation decision circuitry 170 may also change a content to be notified to the management terminal 300. Similarly, the degradation notification circuitry 160 may also change a notification display to be turned on on a display device. For example, the further the estimated degradation level exceeds the reference degradation level, the larger the number of notification may also be made or the shorter a notification interval may also be made.

In addition, a text to be displayed on the management terminal 300 or a display device may also be changed such that a sense of unease is felt over a likelihood that a device on which the motor 21 is mounted may degrade.

In addition, in Embodiments 2 to 5, a case is described above in which the learning circuitry 141 in the control circuitry 130 has the data acquisition circuitry 141*a* configured to acquire learning data that includes a voltage command value in an arbitrary cycle and the switching pattern in a previous cycle, which is immediately prior to the arbitrary cycle, and the model generation circuitry 141*b* configured to generate a learned model used to infer the switching pattern in the arbitrary cycle by use of the learning data. From the learning circuitry 141, however, the data acquisition circuitry 141*a* and the model generation circuitry 141*b* may also be omitted. Specifically, a learned model may also be stored in advance in the memory circuitry 180 in the motor controller 1 or the motor control system 1A. The learned model stored in the memory circuitry 180 is, similarly to one described in Embodiments 2 to 5, one used to infer the switching pattern in an arbitrary cycle by use of learning data that includes the voltage command value in the arbitrary cycle and the switching pattern in a previous cycle, which is immediately prior to the arbitrary cycle. The learned model stored in the memory circuitry 180 is, for example, one obtained through a learning process performed by a computer provided outside the motor controller 1 or the motor control system 1A.

REFERENCE SIGNS LIST

1: motor controller, 1A: motor control system, 2: compressor, 3: power source, 4: electric-power converter device, 5: current sensor, 6: voltage sensor, 10: control unit, 21: motor, 21*a*: rotor core, 21*b*: stator core, 22: suction pipe, 23: main shaft, 24: oil pump, 25: sub-shaft bearing, 26: main shaft bearing, 27: compression mechanism, 28: discharge pipe, 41: rectifier circuit, 42: electrolytic capacitor, 43: inverter, 43*a*: switching element, 43*b*: backflow-prevention element, 44: wire, 71: pressure sensor, 72: flow-rate sensor, 73: temperature sensor, 74: humidity sensor, 80: bus-voltage sensor, 130: control circuitry, 131: vector control circuitry, 132: synchronous-pattern selection circuitry, 133: voltage-phase arithmetic circuitry, 134: correction-amount arithmetic circuitry, 135: carrier-wave generation circuitry, 136: gate-pulse generation circuitry, 137: state observation circuitry, 141: learning circuitry, 141*a*: data acquisition circuitry, 141*b*: model generation circuitry, 141*c*: reward calculation circuitry, 141*d*: function update circuitry, 142: inference circuitry, 150: degradation estimation circuitry, 160: degradation notification circuitry, 170: operation decision circuitry, 180: memory circuitry, 200: user terminal, 300: management terminal, 400: management panel

The invention claimed is:

1. A motor controller configured to control a motor that is driven by electric power supplied from a power source and converted by use of an electric-power converter device provided with an inverter, the motor controller comprising:

degradation estimation circuitry configured to calculate an estimated degradation level, based on a motor current, obtained by estimating a degradation level of a device on which the motor is mounted or a degradation level of the inverter;

operation decision circuitry configured to compare the estimated degradation level and a reference degradation level, which is predetermined, and set an operation mode of the motor, in a case in which the estimated degradation level is lower than the reference degradation level, to a normal operation, and set the operation mode, in a case in which the estimated degradation level is higher than or equal to the reference degradation level, to a low-noise pulse operation; and control circuitry configured to control the inverter according to the operation mode, the low-noise pulse operation being designed to reduce switching loss to be less than does the normal operation, the degradation estimation circuitry being configured to acquire the estimated degradation level on the basis of a strength level of sideband waves that appear in a two-phase electric current among a three-phase alternating electric current that flows from the inverter through the motor.

2. The motor controller of claim 1, wherein the control circuitry is configured to control the inverter by changing a switching pattern that is one of a set of switching states each in response to a single cycle of a voltage command value through which an output voltage of the inverter is ordered, and the low-noise pulse operation is designed to adjust the switching pattern.

3. The motor controller of claim 2, wherein the control circuitry is configured to operate the low-noise pulse operation based on synchronous PWM control in which a frequency of a carrier signal is set to be equal to an integral multiple of a frequency of an output voltage of the inverter, and in the synchronous PWM control, the further a speed command value with which a rotational speed of the motor is ordered increases, the further a switching count is decreased.

4. The motor controller of claim 3, further comprising: memory circuitry in which a learned model is stored, the learned model being generated by use of learning data that includes the voltage command value in an arbitrary cycle and the switching pattern in a previous cycle immediately prior to the arbitrary cycle, the learned model being used to infer the switching pattern in the arbitrary cycle, wherein the degradation estimation circuitry is configured to estimate a degraded location that indicates either one of the motor and the inverter on the basis of an electric current that flows from the inverter to the device on which the motor is mounted, and the operation decision circuitry is configured to set the operation mode to, on the basis of the degraded location, the low-noise pulse operation based on the synchronous PWM control or the low-noise pulse operation based on AI switching control that uses the learned model.

5. The motor controller of claim 2, wherein the control circuitry has data acquisition circuitry configured to acquire learning data that includes the voltage command value in an arbitrary cycle and the switching pattern in a previous cycle immediately prior to the arbitrary cycle, and model generation circuitry configured to generate a learned model used to infer the switching pattern in the arbitrary cycle by use of the learning data.

6. The motor controller of claim 5, wherein the control circuitry has gate-pulse generation circuitry configured to generate, by inputting the switching pattern generated in a previous cycle immediately prior to a time of control and the voltage command value at the time of control, the switching pattern at the time of control according to the learned model.

7. The motor controller of claim 5, wherein the learned model is used to determine the switching pattern adjusted such that, in addition to adjustment in which the switching loss is reduced to be less than in a case of the normal operation, at least one of a driving sound, oscillation, and an electric current harmonic of the device on which the motor is mounted and a voltage applied to the inverter is reduced to be less than in a case of the normal operation.

8. The motor controller of claim 5, wherein the control circuitry has reward calculation circuitry configured to calculate a reward on the basis of the strength level of the sideband waves centered on a basic frequency in an electric current that flows through the motor or a switching count of the inverter, and function update circuitry configured to update the learned model on the basis of the reward input from the reward calculation circuitry.

9. The motor controller of claim 8, wherein the reward calculation circuitry is configured to increase the reward in the switching pattern in a case in which the switching count reduces from the switching count in the switching pattern based on a pre-update one of the learned model and to reduce the reward in the switching pattern in a case in which the switching count increases from the switching count in the switching pattern based on the pre-update one of the learned model.

10. The motor controller of claim 8, wherein the reward calculation circuitry is configured to increase the reward in the switching pattern in a case in which the strength level of the sideband waves is lower than or equal to a default value and to reduce the reward in the switching pattern in a case in which the strength level of the sideband waves is higher than the default value.

11. The motor controller of claim 2, further comprising: memory circuitry in which a learned model is stored, the learned model being generated by use of learning data that includes the voltage command value in an arbitrary cycle and the switching pattern in a previous cycle immediately prior to the arbitrary cycle, the learned model being used to infer the switching pattern in the arbitrary cycle.

12. The motor controller of claim 1, wherein the degradation estimation circuitry is configured to calculate the estimated degradation level on the basis of an electric current that flows from the inverter to the device on which the motor is mounted.

13. The motor controller of claim 1, further comprising: degradation notification circuitry configured to cause a display device to turn on a notification display that indicates that the device on which the motor is mounted degrades in a case in which the estimated degradation level reaches the reference degradation level or a driving time of the device on which the motor is mounted reaches a reference driving time, which is predetermined, wherein the operation decision circuitry is configured to set the low-noise pulse operation in accordance with a low-noise pulse-operation start signal that is received from the degradation notification circuitry and that corresponds to whether a user allows the low-noise pulse operation to start.

14. The motor controller of claim 13, wherein the degradation estimation circuitry is configured to estimate a degraded location that indicates either one of the motor and the inverter on the basis of an electric current that flows from the inverter to the device on which the motor is mounted, and the degradation notification circuitry is configured to cause the display device to display the degraded location.

15. The motor controller of claim 1, wherein the device is a compressor that is connected to the motor and has a main shaft via which rotational energy is transferred to a compression mechanism and a main shaft bearing that supports the main shaft such that the main shaft is rotatable, and the degradation estimation circuitry is configured to acquire the estimated degradation level by analyzing the strength level of the sideband waves of a basic frequency caused to be generated by degradation of the main shaft bearing.

16. A motor control system configured to control a motor that is driven by electric power supplied from a power source and converted by use of an electric-power converter device provided with an inverter, the motor control system comprising:

degradation estimation circuitry configured to calculate an estimated degradation level, based on a motor current, obtained by estimating a degradation level of a device on which the motor is mounted or a degradation level of the inverter;

operation decision circuitry configured to compare the estimated degradation level and a reference degradation level, which is predetermined, and set an operation mode of the motor, in a case in which the estimated degradation level is lower than the reference degradation level, to a normal operation, and set the operation mode, in a case in which the estimated degradation level is higher than or equal to the reference degradation level, to a low-noise pulse operation; and control circuitry configured to control the inverter according to the operation mode, the low-noise pulse operation being designed to reduce switching loss to be less than does the normal operation, the degradation estimation circuitry being configured to acquire the estimated degradation level on the basis of a strength level of sideband waves that appear in a two-phase electric current among a three-phase alternating electric current that flows from the inverter through the motor.

17. A motor control method of controlling a motor that is driven by electric power supplied from a power source and converted by use of an electric-power converter device provided with an inverter, the motor control method comprising:

calculating an estimated degradation level, based on a motor current, obtained by estimating a degradation level of a device on which the motor is mounted or a degradation level of the inverter;

comparing the estimated degradation level and a reference degradation level, which is predetermined, and setting an operation mode of the motor, in a case in which the estimated degradation level is lower than the reference degradation level, to a normal operation, and setting the operation mode, in a case in which the estimated degradation level is higher than or equal to the reference degradation level, to a low-noise pulse operation; and controlling the inverter according to the operation mode,
the low-noise pulse operation being designed to reduce switching loss to be less than does the normal operation,
the estimated degradation level being acquired on the basis of a strength level of sideband waves that appear in a two-phase electric current among a three-phase alternating electric current that flows from the inverter through the motor.

* * * * *